US009972201B2

(12) United States Patent
Wang

(10) Patent No.: US 9,972,201 B2
(45) Date of Patent: May 15, 2018

(54) METHOD AND SYSTEM FOR LEGAL PARKING

(71) Applicant: Kevin Sunlin Wang, Flushing, NY (US)

(72) Inventor: Kevin Sunlin Wang, Flushing, NY (US)

(73) Assignee: OPERR Technologies, Inc., Flushing, NY (US)

(*) Notice: Subject to any disclaimer, the term of this patent is extended or adjusted under 35 U.S.C. 154(b) by 0 days. days.

(21) Appl. No.: 15/645,079

(22) Filed: Jul. 10, 2017

(65) Prior Publication Data

US 2017/0309170 A1    Oct. 26, 2017

Related U.S. Application Data

(63) Continuation of application No. 14/859,274, filed on Sep. 19, 2015, now Pat. No. 9,704,392.

(60) Provisional application No. 62/210,701, filed on Aug. 27, 2015, provisional application No. 62/150,118, filed on Apr. 20, 2015, provisional application No. 62/104,510, filed on Jan. 16, 2015, provisional application No. 62/092,100, filed on Dec. 15, 2014, provisional application No. 62/086,560, filed on Dec. 2, 2014.

(51) Int. Cl.
*B60Q 1/48* (2006.01)
*G08G 1/01* (2006.01)
*G07B 15/02* (2011.01)
*G08G 1/14* (2006.01)

(52) U.S. Cl.
CPC ........... *G08G 1/0112* (2013.01); *G07B 15/02* (2013.01); *G08G 1/012* (2013.01); *G08G 1/0129* (2013.01); *G08G 1/0141* (2013.01); *G08G 1/144* (2013.01); *G08G 1/146* (2013.01); *G08G 1/147* (2013.01)

(58) Field of Classification Search
CPC ........ G07F 17/42; G08G 1/142; G08G 1/145; G08G 1/017; G08G 1/148; G07B 15/02
USPC ................... 340/932.2, 934, 870.03, 870.02; 701/400, 1, 117; 705/13, 39, 418
See application file for complete search history.

(56) References Cited

U.S. PATENT DOCUMENTS

| | | | | |
|---|---|---|---|---|
| 7,950,570 B2 * | 5/2011 | Marchasin | ............ | B60R 25/093 |
| | | | | 194/900 |
| 8,063,797 B1 * | 11/2011 | Sonnabend | ........ | G06K 9/00791 |
| | | | | 340/932.2 |
| 8,229,658 B1 * | 7/2012 | Dabell | ................. | G08G 1/0129 |
| | | | | 701/117 |
| 8,306,734 B2 * | 11/2012 | Mathews | ........... | G01C 21/3685 |
| | | | | 701/408 |

(Continued)

*Primary Examiner* — Hoi Lau
(74) *Attorney, Agent, or Firm* — Monte, Wang & Associates, PLLC

(57) ABSTRACT

The various embodiments herein provide a system and method for a parking zone mapping, storing and alerting a user for a legal parking to avoid parking violations. The system comprises a location identifier, an accelerometer, a unified database, a data processing module and a display apparatus. The unified database resides in a central server. The unified database is synchronized with the location identifier. The data processing module is connected to the location identifier and the unified database through a communication medium. The data processing module is further connected to the accelerometer. The display apparatus is connected to the data processing module.

20 Claims, 9 Drawing Sheets

(56) References Cited

U.S. PATENT DOCUMENTS

| Patent/Publication No. | | Date | Inventor | Classification |
|---|---|---|---|---|
| 8,432,297 | B2* | 4/2013 | Sonnabend | G06K 9/00791 340/932.2 |
| 8,610,597 | B2* | 12/2013 | Stefik | G06Q 10/02 340/425.5 |
| 8,730,062 | B2* | 5/2014 | Eldershaw | G08B 13/1672 340/521 |
| 9,171,461 | B1* | 10/2015 | Dabell | G08G 1/0137 |
| 9,704,392 | B2* | 7/2017 | Wang | G08G 1/0112 |
| 2005/0068196 | A1* | 3/2005 | Marin | G07B 15/00 340/932.2 |
| 2006/0106504 | A1* | 5/2006 | Carpenter | G08G 1/017 701/1 |
| 2006/0152349 | A1* | 7/2006 | Ratnakar | G07B 15/00 340/426.1 |
| 2007/0085704 | A1* | 4/2007 | Long | G06Q 30/0284 340/932.2 |
| 2008/0114675 | A1* | 5/2008 | Ward | G06Q 20/127 705/323 |
| 2008/0212414 | A1* | 9/2008 | Mardirossian | G07F 17/42 368/90 |
| 2011/0099126 | A1* | 4/2011 | Belani | G06Q 30/0284 705/418 |
| 2011/0140927 | A1* | 6/2011 | Lee | G08G 1/207 340/993 |
| 2011/0148662 | A1* | 6/2011 | Lowenthal | G07B 15/02 340/932.2 |
| 2011/0224899 | A1* | 9/2011 | Mathews | G01C 21/3685 701/533 |
| 2012/0053998 | A1* | 3/2012 | Redmann | G06Q 10/02 705/13 |
| 2012/0062395 | A1* | 3/2012 | Sonnabend | G06K 9/00791 340/932.2 |
| 2012/0092190 | A1* | 4/2012 | Stefik | G06Q 10/02 340/932.2 |
| 2012/0092191 | A1* | 4/2012 | Stefik | G06Q 10/02 340/932.2 |
| 2012/0127308 | A1* | 5/2012 | Eldershaw | G08G 1/147 348/143 |
| 2012/0218122 | A1* | 8/2012 | Bogaard | G07B 15/02 340/870.03 |
| 2012/0245981 | A1* | 9/2012 | Volz | G07B 15/02 705/13 |
| 2012/0323643 | A1* | 12/2012 | Volz | G07B 15/02 705/13 |
| 2013/0187795 | A1* | 7/2013 | Lowenthal | G08G 1/127 340/989 |
| 2013/0262275 | A1* | 10/2013 | Outwater | G06Q 10/02 705/27.1 |
| 2014/0122190 | A1* | 5/2014 | Wolfson | G06Q 10/0631 705/13 |
| 2014/0214500 | A1* | 7/2014 | Hudson | G06Q 30/0284 705/13 |
| 2014/0292510 | A1* | 10/2014 | Cholhan | G08B 21/02 340/539.13 |
| 2014/0320318 | A1* | 10/2014 | Victor | G08G 1/142 340/932.2 |
| 2015/0091741 | A1* | 4/2015 | Stefik | G06Q 10/02 340/932.2 |
| 2015/0102946 | A1* | 4/2015 | Kareev | G08G 1/0175 340/932.2 |
| 2015/0138362 | A1* | 5/2015 | Stefik | G06Q 10/02 348/148 |
| 2015/0279213 | A1* | 10/2015 | Balter | G08G 1/144 705/13 |
| 2016/0012726 | A1* | 1/2016 | Wang | G08G 1/0112 340/932.2 |
| 2016/0061625 | A1* | 3/2016 | Wang | G01C 21/32 701/454 |
| 2016/0063863 | A1* | 3/2016 | Stefik | G06Q 10/02 340/932.2 |
| 2016/0077581 | A1* | 3/2016 | Shi | G06F 3/011 340/12.5 |
| 2016/0117866 | A1* | 4/2016 | Stancato | G07B 15/00 705/5 |
| 2016/0155332 | A1* | 6/2016 | Wang | G01C 21/3685 340/932.2 |

\* cited by examiner

METHOD AND SYSTEM FOR LEGAL PARKING

CROSS-REFERENCE TO RELATED APPLICATION

The present application is a continuation of and claims priority to U.S. patent application Ser. No. 14/859,274, filed on Sep. 19, 2015, now U.S. Pat. No. 9,704,392, issued Jul. 11, 2017, which is based on and claims priority to provisional application Ser. No. 62/210,701, filed on Aug. 27, 2015, provisional application Ser. No. 62/150,118, filed on Apr. 20, 2015, provisional application Ser. No. 62/113,922, filed on Feb. 9, 2015, provisional application Ser. No. 62/092,100, filed on Dec. 15, 2014, and provisional application Ser. No. 62/086,560, filed on Dec. 2, 2014, the entire contents of all of which are herein incorporated by reference.

BACKGROUND

Technical Field of Invention

The present invention generally relates to parking systems and particularly to methods and systems for assisting in legal parking of vehicles. The present invention more particularly relates to a method and system for providing mapping a parking zone, storing and alerting a user for a legal parking.

DESCRIPTION OF RELATED ART

Due to an increase in number of vehicles and restrictions related to an allowance of parking spaces or zones that allow a driver to legally park his or her vehicle, parking has become increasingly difficult to find, especially in large cities such as New York City (hereinafter "NYC"). In cities like NYC, there may be a large number of reasons for restricting where people can park and a high demand for parking spaces. The local parking ordinances and rules frequently regulate an allowable space and duration for a vehicle to be parked along public roadways.

Since finding a legal parking is an effective way to avoid a parking violation, it is therefore often that the drivers accidentally or unknowingly commit parking violations due to a lack of alternative parking options. The drivers spend an exorbitant amount of time trying to find a legal parking space by randomly driving around, which causes more traffic congestion. The constant congestion and lack of parking spaces paired with the continuing increase of vehicles on the road also exacerbates the current rate of parking violations. However, in order to save time and efficiently use a legal parking space on the street and off the street, a driver would benefit from being notified of other drivers who know they will be leaving at the time another driver is searching for a parking space or at a certain time in the near future.

Since public parking or government public garages are substantially cheaper than commercial parking, it is understandable that a driver tries to find parking primarily on the street or within a public garage. It is very important to notify the driver when and where they may park by precluding illegal parking spaces to avoid parking violations and save time to find legal parking. Although, since the street parking is owned and managed by the government or government agencies, they do not have the resources or the ability to notify the drivers where legal parking spaces on the street are available. It is a more realistic and efficient approach for drivers to help each other look for legal on street parking.

Additionally, the drivers would benefit from being made aware of the various options for on-street and off-street parking to make informed decisions in order to park where there is legal parking. If a driver is advised about a legal parking space, the chances of a parking violation will be reduced substantially.

In the view of foregoing, there is a need for a method for legally parking a vehicle with a real inter-vehicle or driver communication with dynamic space vacancy information sharing. Also there is a need for a system to facilitate an in-time communication among drivers and a parking space monitoring to avoid congestion due to random movement of the vehicles for a parking space.

The above mentioned shortcomings, disadvantages and problems are addressed herein, as detailed below.

SUMMARY OF THE INVENTION

The following presents a simplified summary in order to provide a basic understanding of some novel embodiments described herein. This summary is not an extensive overview, and serves to present some concepts in a simplified form as a introduction to the more detailed description that is presented later.

The primary object of the embodiments herein is to provide a method and a system for a parking space monitoring and assisting the driver for a legal parking.

Another object of the embodiments herein is to provide a resource to the users to inform or educate them as to where legal parking exists and their options for legal parking in the area they are currently located or will be travelling to.

Yet another object of the embodiments herein is to provide a method for compiling a database of an on-street and off-street legal parking areas, and allowing for social connections among drivers who already parked a vehicle and drivers looking for parking their vehicles in order to accept and exchange parking related information.

Yet another object of the embodiments herein is to provide a method for assisting a driver to find legal parking alternatives, rather than taking risks by parking in locations with possible adverse consequences.

The various embodiments herein provides a system and method for a parking zone mapping, storing and alerting a user for a legal parking. The method comprises storing a plurality of historical and real-time parking violations in a unified database residing in the central server, and receiving a geocoded location sent through the Global positioning module.

According to an embodiment herein, locations may be identified using a Global Positioning module installed in the mobile device or a Global Positioning System (GPS) navigation device installed in a vehicle.

According to an embodiment herein, the unified database stores a plurality of parking rules, violation codes, abbreviations used by law enforcement agencies, historical parking violation citations and real-time crowd-sourced parking violation citations. The unified database further stores a plurality of parking meter locations and applicable fees, and public parking, private parking and commercial parking garage information. The data processing module cross-correlates an identified current location of a user with a time and a location of each of the issued parking violation citations and parking rules to predict a likelihood of obtaining legal parking at the user's identified current location, time and date.

According to an embodiment herein, a parking intent of the user is identified by determining and analyzing the speed and location through the accelerometer and the location identifier respectively. When the user shows a parking intent, the system will check the unified database for any potential parking violation citations applicable to the location depending on the time and day. If there are potential parking violations, then the system will alert the user and the user may prompt the system to show alternative parking information. The alternative parking information comprises a type of vehicle plate, a type of vehicle, name and location of an in-door or out-door parking facility, a height and a size of the vehicle, an estimated time of arrival to a concerned parking facility, a walking time and distance from the concerned parking facility to a destination of the user, a cost of parking, an availability of parking, hours of operation and direction to said parking facility. According to an embodiment herein, a leaving intent of the user is also identified by determining and analyzing the speed and location through the accelerometer and the location identifier respectively. When the user shows a leaving intent, the system can check and match the user with any other users who have a parking intent. These users may choose to connect through the social media function as consideration for accepting the parking space.

According to an embodiment herein, the method precludes unavailable or illegal parking spaces that are identified with different formats, lines or shapes, such as colors for example, on the electronic map or location data shown over the display module.

According to an embodiment herein, the different formats are used to identify density of issued parking violation citations at specific locations or for broad or narrow geographic areas, such as a borough, block or street, an unavailability and illegality of parking spaces. The format further identifies a plurality of fluctuations in number of issued parking violation citations reflected at specific locations based on the time of the day and historical parking violation summary data for said location at time of the day. The users of commercial and non-commercial vehicles view different identification maps.

The embodiments herein disclose a method for avoiding receiving parking meter violation citations comprises monitoring a geolocation of the vehicle by the GPS identifier, locking the vehicle location and transmitting the location data information to the unified database. The system will identify a duration of the vehicle parked at a parking meter based on the monitored geolocation of the vehicle. When the expiration of the parking meter is approaching, the system will send a notification to the first user about the approaching expiration of the parking meter. The first user may extend the parking meter by refilling the parking meter by himself or herself. If the first user cannot refill the parking meter due to certain circumstances, then the first user may seek the assistance of a second user to help in refilling the parking meter.

According to an embodiment herein, the method incorporates a social media feature to connect a plurality of users with each other as consideration to accept parking related information.

According to an embodiment herein, the parking information comprises a plurality of parking rules and regulations, potential legal parking locations availed from the unified database for current location of the user, potential legal parking locations availed from the unified database for current location of the user for a location requested by the user and alternative parking information for a specific location. The alternative parking information comprises a type of vehicle plate, a type of vehicle, name and location of an in-door and out-door parking facility, a height and a size of the vehicle, an estimated time of arrival to a concerned parking facility, a walking time and distance from the concerned parking facility to a destination of the user, a cost of parking, an availability of parking, hours of operation and direction to said parking facility.

According to an embodiment herein, the method further comprises obtaining real-time information street cleaning schedules from a municipal body, a company performing street cleaning, a driver employed by the municipal body or the company, and the nearby citizens and sending a notification to the users desiring to avail a parking in the concerned street once the street cleaning is indicated as having been completed.

The embodiments herein provides a method to provide parking violation alerts by combining a parking advisory with a route planning through a GPS navigation device or a mobile device. The advisory mode provides legal information about a parking zone and provides alternative parking space information with routing information when the current parking zone has potential parking violations.

The embodiments herein provide a method to build a database of legal parking space or garage database. The method comprises collecting and storing information from various sources, including but not limited to government websites, a plurality of owners and authorized managers of private or public parking spaces or garages and registering and updating parking related information provided by the owners and the authorized managers.

According to an embodiment herein, a method for the users to demand commercial parking spaces or private parking spaces comprises sending a confidential request by a first user to a plurality of secondary users who own or manage commercial parking garage spaces or private parking spaces to demand an offer for a parking space in a parking area, for an allotted period of time or day, at a proposed price, and for a size of the first user's vehicle.

According to an embodiment herein, the method further allows users to offer commercial parking spaces or private parking spaces by listing a price, time or day, location of the parking space and other parking related information. Users seeking a parking space may negotiate on the pricing and other terms until both users come to an agreement.

According to an embodiment herein, a method for avoiding receiving parking meter violation citations by refilling the parking meter on time or parking in a legal parking spot where users can seek the assistance of other users to refill the parking meter.

According to an embodiment herein, the method incorporates a social media feature into an online platform to connect the users as consideration for requesting parking spaces available in real time and exchanging parking related information. The method comprises posting a request notification by a first user looking for a parking space in real time, which is sent to a plurality of users having their vehicles parked in a closest proximity to the first user's vehicle location. The plurality of users may accept or reject the request. If there is a rejection of the request notification by the second user, the request notification keeps transferring until at-least one user accepts the request notification of the first user.

According to an embodiment herein, the method incorporates a social media feature into an online platform to connect the users in consideration for requesting parking spaces available in the near future. The method comprises posting a request notification by a third user looking for a parking space in near future, which is sent to the plurality of users having their vehicles parked within a specific radius of the first user's intended destination. The request notification keeps transferring until at-least one user accepts the request notification. At-least one user can retract a rejection or accept the request notification at any time in case the request notification is still pending to be accepted by another user.

According to an embodiment herein, the method of incorporating a social media feature as consideration for accepting parking related information when requesting parking spaces available in real time or the near future is also applied to when offering parking spaces available in real time or the near future. Monetary payments or non-monetary rewards may also serve as another consideration option for accepting parking related information.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
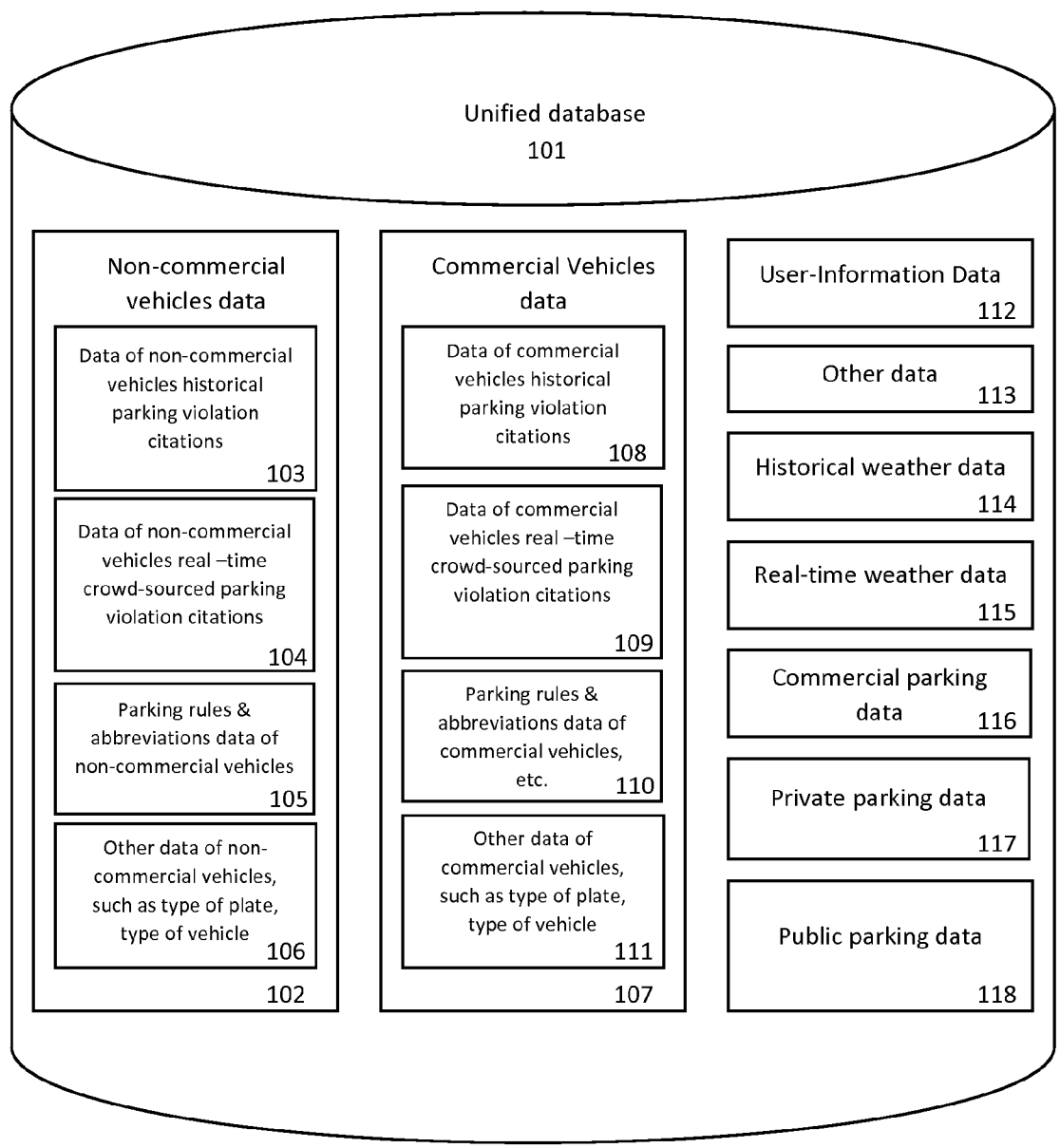
FIG. 1 is a diagram illustrating a unified database in accordance with exemplary embodiments of the present invention.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner. The system and method is applicable worldwide. However for the purposes of providing a main example for implementation, the invention may be described herein with reference to a modern metropolis such as NYC. The terms "driver(s)" may be used interchangeably with "User(s)." However, "User(s)" is intended to encompass not only driver(s), but also those individuals who may not be a driver or driving but provide assistance to drivers by using the system. The system may assist both users and drivers to avoid parking tickets by directing them to locations of legal parking.

According to an exemplary embodiment herein, the present invention connect internally with various functions of a mobile device or in-vehicle navigation system that include but are not limited to an internal clock mechanism, a phone call function, a microphone, a GPS tracking for geo-location mapping (latitude and longitude coordinates), and/or camera, etc. A mobile application running on the mobile device and utilize resources which includes a microprocessor, a memory, a GPS, a wireless connection and a display. The notifications are accomplished through one or more media such as the visual display or audio system, etc.

According to an embodiment herein, the system and method integrates an electrical/digital map (e.g. Google Maps™) on the mobile device. The roads and routes are displayed from the map database and are presented with the analyzed data related to the location and relevant information for legal parking in an easily understandable manner by the user.

The various embodiments herein provides a system for a parking zone mapping, storing and alerting a user for a legal parking, the system comprises a location identifier, an accelerometer, an unified database, a data processing module and a display apparatus. The unified database resides in a central server. The unified database is synchronized with the location identifier. The data processing module is connected to the location identifier and the unified database through a communication medium. The data processing module is further connected to the accelerometer. The display apparatus is connected to the data processing module.

According to an embodiment herein, the location identifier is a Global Positioning module installed in the mobile device along with the accelerometer. The location identifier and the accelerometer are wirelessly connected to the unified database and the data processing module.

According to an embodiment herein, the mobile device comprises an internal clock mechanism. The internal clock mechanism measures a time of a parked vehicle according to a parking meter. The internal clock mechanism sends a notification over the display apparatus as the expiration of the parking time nears for the parked vehicle. The notification may include the option where the user may set up one or more different advance time reminder alerts with varying lengths of time. The amount of time for the advance reminder alert can be adjusted by the user.

According to an embodiment herein, the location identifier is a Global Positioning System (GPS) navigation device installed in a vehicle along with the accelerometer. The location identifier and the accelerometer are connected to the data processing module through either a wired or a wireless medium.

According to an embodiment herein, the Global Positioning System (GPS) navigation device comprises an internal clock mechanism. The internal clock mechanism measures a time of a parked vehicle according to a parking meter. The internal clock mechanism sends a notification over the display apparatus as the expiration of the parking time nears for the parked vehicle.

According to an embodiment herein, the unified database stores a plurality of parking rules, violation codes, abbreviations used by law enforcement agencies, historical parking violation citations and real-time crowd-sourced parking violation citations. The unified database further stores a plurality of issued parking violation citations including geolocations, reasons and time and date of the issued parking violation citations, a plurality of parking meter locations and applicable fees, and a parking garage information. The data processing module cross-correlates an identified current location of a user with a time and a location of each of the issued parking violation citations and parking rules to predict a likelihood of obtaining legal parking at the user's identified current location, time and date.

According to an embodiment herein, the display apparatus issues a parking notification about a predicted likelihood of legal parking.

According to an embodiment herein, a parking intent of the user is identified by determining and analyzing an instantaneous speed and location through the accelerometer and the location identifier respectively. A leaving intent of the user is identified by determining and analyzing increases in motion and location after parking through the accelerometer and the location identifier respectively.

According to an embodiment herein, the processing module further transmits a parking information over the display apparatus at a user's request. The parking information comprises a plurality of parking rules and regulations, potential legal parking locations availed from the unified database for current location of the user, potential legal parking locations availed from the unified database for current location of the user for a location requested by the user and alternative parking information for a specific location. The alternative parking information comprises a type of vehicle plate, a type of vehicle, name and location of an in-door or out-door parking facility, a height and a size of the vehicle, an estimated time of arrival to a concerned parking facility, a walking time and distance from the concerned parking facility to a destination of the user, a cost of parking, an availability of parking, hours of operation and direction to said parking facility.

According to an embodiment herein, the central server further comprises a microprocessor and a server readable program storage medium. The program storage medium is non-transitory and tangible in nature. The program storage medium embodies a program of instructions executable by the microprocessor to search and update a parking related data and assist in finding a legal parking and refilling a parking meter.

According to an embodiment herein, the system further comprises a server readable weather forecast application program interface (API) to access historical weather information stored within the unified database. The weather forecast API determine weather conditions for a parking zone and issues an alert on determining a negative impact of the weather conditions over the parking conditions at the parking zone.

The embodiments herein provide a method for a parking zone mapping, storing and alerting a user for a legal parking. The method comprises storing a plurality of historical and real time parking violations in a unified database based on the type of vehicle and type of vehicle plate and receiving a geocoded location sent through the Global positioning module of the location identifier. A historic background of parking violation in the sent geocoded location is searched. The searching is performed in a unified database through a microprocessor stored in a central server. The system displays potential legal parking spaces by precluding illegal parking based on the historical parking violation data and parking rules over a display apparatus. The method further comprises monitoring a parking meter data of the concerned geocoded location through the central server and sending the parking meter data to a processing module. The processing module compares the duration of parking of vehicles in the received parking meter data. The processing module lists the parking zones of the vehicles with shortly expiring parking meter. The processing module lists the location of the parked vehicles whose parking meter is expiring within an arrival period of the user's vehicle.

According to an embodiment herein, the unified database resides in the central server, which stores and processes data through a microprocessor.

According to an embodiment herein, the method precludes unavailable or illegal parking spaces that are identified with different formats, lines or shapes, such as colors for example, on the electronic map or location data shown over the display module.

According to an embodiment herein, the different formats are used to identify density of issued parking violation citations at specific locations. For example, the density comprises a parking locations with higher number of issued parking citations marked by darker colors compared to locations with lesser density of issued parking violation citations. The format further identifies a density of issued parking violation citations for broad or narrow geographic area, such as borough, block or street, an unavailability or illegality of parking spaces. The illegal parking spaces may be identified by different colors and shapes. For example, the red solid lines indicate that a parking is illegal, whereas the red dotted lines indicate that parking spaces are occupied by the users. A green color between the red dotted lines indicates currently available parking spaces. The format further identifies a plurality of fluctuations in number of issued parking violation citations reflected at specific locations based on the time of the day and historical parking violation summary data for said location at time of the day. The users of commercial and non-commercial vehicles view different identification maps since parking is always related to the type of vehicle or the type of vehicle plate. For example, Users indicating they drive commercial trucks may view green colors or other formats displayed on the screen for areas that have special parking rules that allow commercial trucks to park while Users of non-commercial vehicles may view red colors in the same areas since they will not be allowed to park due to applicable parking limitations.

According to an embodiment herein, a microprocessor provided in the central sever performs data analysis for patterns and also isolated incidents used to find meaningful patterns for parking violations based on the raw data from the database due to the complexity of various algorithms. The patterns are differentiated through different colors, or other format of indication, to alert the users when searching for a parking spot, for example, the locations with a higher number of parking violations may be indicated with deeper colors compared to lighter colors for locations with a lesser number of parking violations in the electronic map of the system. The colors for a location change dynamically according to the time in which the user is viewing the information because different times during a day may have different amount of previously issued violation citations. The user set the system to show the current time, a time frame, and/or a certain amount of time in the future. The system also is used to produce interactive maps that indicate parking violation hot spots by using various colors to indicate the density of violations and histograms of parking tickets. The colors are used to show legal parking availability at specific locations and street parking assessment rating to indicate street parking occupancy and availability of legal parking spots. The colors for a location may change dynamically according to the time in which the user is viewing the information because different times during a day may be subject to different parking rules allowing for legal parking. The user set the system to show the current time, a time frame, or a certain amount of time in the future when the user intends to park. Additionally, the users able to search individual parking spaces and/or streets, which are indicated to show illegal parking on an electronic map within the mobile application with various colors according to information in the unified database. The electronic map reflects, using colors, where parking is illegal due to the applicable rules and provides notifications about these locations to the user based on his or her intended destination. This includes temporary notices issued by the government for events, construction, road work, etc. The colors are also used to indicate individual parking spaces where parking is unavailable because a user of the mobile application has indicated they are parked in the parking space. Since it is a waste of time and resources for a driver to drive to a certain location and discover that there is no parking allowed, this function is useful for allowing users to know about the situation by searching the area before the user travels to the location to look for parking. If the user sees a color that indicates that there is no parking at certain streets in the area, then the user may choose to go to another area instead. Additionally, users will have an increased chance of finding potential parking when they have knowledge of where they cannot park before going to the area.

According to an embodiment herein, the present invention uses color(s) to indicate certain information/data and/or to differentiate certain information/data. However, it is to be understood that the use of color(s) is not limited, as other formats (e.g. shapes, pictures, categories, etc.) are used in the place of colors to indicate certain information/data and/or to differentiate certain information/data.

According to an embodiment herein, the unified database stores a plurality of parking rules, violation codes, abbreviations used by law enforcement agencies, historical parking violation citations and real-time crowd-sourced parking violation citations.

According to an embodiment herein, the unified database further stores a plurality of issued parking violation citations including geolocations, reasons and time and date of the issued parking violation citations, a plurality of parking meter locations and applicable fees, and a parking garage information.

The embodiments herein disclose a method for avoiding receiving parking meter violation citations comprises monitoring a geolocation of the vehicle of a first user by the GPS identifier, locking the first user's vehicle location and transmitting the location data information to the unified database and identifying a duration of the vehicle parked at a parking meter based on the monitored geolocation of the vehicle. The internal clock mechanism will alert to an approaching expiration of the parking meter of the parked vehicle. A parking meter location and corresponding parking cost information for extension of the parking duration in the parking meter at the concerned location is identified by the unified database followed by sending a notification to the first user about approaching expiration of the parking meter, wherein said notification is sent by SMS, phone call or email and determining a response from the first user to extend the parking meter. The first user may refill the meter by himself/herself, or may seek the assistance of another user who may accept to provide assistance in refilling the parking meter. If the user seeks the assistance of another user, the system may send a request notification, which comprises a location data, a maximum waiting period and parking charges for concerned location.

According to an embodiment herein, the method further comprises an assistance in feeding a parking meter for a parked vehicle comprising the steps of sending a request for refilling a parking meter by the first user to a plurality of secondary users located within a certain radius of the first user's vehicle and an information about the parked vehicle of the first user including a cost of the parking meter and proposed service fee. Information about the parked vehicle of the first user including a location and an estimated distance or time consumption from the first user's vehicle may also be sent. The first user further sends financial information over a mobile device of the secondary user. The financial information comprises an amount to be paid to the payment meter, the first user's vehicle details such as the plate number, color of the vehicle, or photo of the vehicle and a proposed service fee for the secondary user opting to provide assistance prior to expiration of a parking meter time. On sending the request, the first user receives offers from the secondary users and negotiates a service fee with the interested secondary users to finalize the deal. The first user accepts an offer from at-least one secondary user and the first user places the amount to be paid to the parking meter and the negotiated service fee in an escrow account. The system notifies the secondary user of the amount in escrow and the secondary user completes a payment at the parking meter. The secondary user sends a payment evidence to the mobile device of the first user. The first user transfers the negotiated service fee and the meter cost amount from the account of the first user to an escrow account of through a payment gateway platform or directly to the secondary user after receiving the payment evidence.

Further the users who have engaged in the transaction rate each other and a dispute center may be used to resolve any disputes between the users.

According to an embodiment herein, the method incorporates a social media feature to connect a plurality of users with each other as consideration for users to accept parking related information. The social media feature may be of an original social media system within the mobile application, or the integration of other third party social media applications currently available (for example, Facebook™) to help increase a user's chance of finding parking in a certain location through connecting users.

According to an embodiment herein, the parking information comprises a plurality of parking rules and regulations, potential legal parking locations availed from the unified database for current location of the user, potential legal parking locations availed from the unified database for current location of the user for a location requested by the user and alternative parking information for a specific location. The alternative parking information comprises a type of vehicle plate, a type of vehicle, name and location of an in-door and out-door parking facility, height and size of the in-door parking facility, an estimated time of arrival to a concerned parking facility, a walking time and distance from the concerned parking facility to a destination of the user, a cost of parking, an availability of parking, hours of operation and direction to said parking facility.

According to an embodiment herein, the method further comprises obtaining real-time information street cleaning schedules from a municipal body, a company performing street cleaning, a driver employed by the municipal body or the company, and the nearby citizens and sending a notification to the users desiring to avail a parking in the concerned street.

The embodiments herein provides a method to provide parking violation alerts by combining a parking advisory with a route planning. The method comprises entering a route planning mode through a GPS navigation device or a mobile device. The route planning mode indicates that a user is within a configured radius range of the destination and entering an advisory mode. The advisory mode provides legal information about a parking zone. The processing module retrieves a parking violation citation data and parking rules, and regulations from the unified database and provides advisory parking alerts on identifying a parking intent of the user in the parking zone and suggesting a route to the user to an intended destination. A plurality of parking locations within a specific radius of the intended destination with a least possibility of parking violations is suggested to seek a best opted legal parking space. If there is no on-street parking or public garage available, the option of commercial garage or private parking spaces will be provided and the system may navigate the users to such parking location.

The embodiments herein provide a method to build a database of legal parking space or garage database. The method comprises collecting and storing information related to a plurality of parking spaces and commercial garages and registering and updating parking related information provided by the owners and the authorized managers. Owners and authorized managers of commercial parking garages may register parking related information for the private parking garage with the platform of the system. The parking related information comprises a parking space availability, operating hours, address, phone number, height or size of the entry of the in-door parking facility if applicable, acceptable weight, prices, parking perks and safety measures adopted by the owner.

According to an exemplary embodiment herein, since finding legal parking is strongly related to avoiding parking violations, the system uses a parking violation citation data to cross-correlate with legal parking data. The system obtains parking violation citation data from the unified database, which includes but is not limited to historical citation data for non-commercial vehicles and commercial vehicles, user-information data, violation codes data, historical weather data, real-time weather data, commercial garage data, private parking data, public parking data, and other parking related data. The historical data is obtained from various publically available sources. The historical data is supplemented and updated with crowdsourced, real-time user-reported data. The historical data contains accurate geolocations as identified on parking ticket information used to build the unified database. Additionally, the parking rules, and other parking related information are input into the unified database. The system also processes, analyses and updates the data to reflect any new information being input into the database.

According to an embodiment herein, the unified database stores, among other data, historical records of issued parking violation citations and real-time crowdsourced records of issued parking violation citations. Parking violation data may be input and processed from various sources that include, but are not limited to the government, government agents, municipalities, non-government organizations (NGO's), private entities, community organizations, interested individuals or Users, websites containing useful information such as law enforcement abbreviations, blog posts, social networks, newspapers, professional articles, and any other resources where historical parking violation-related data can be collected etc. (hereinafter, "Informational Sources"). Some of the parking violation data may be provided as public open data from the government agencies and may also be available through a request from the Freedom of Information Act if not available through public government websites.

However, if there is no open government parking citation data available, the system may obtain historical parking citation data through the input from Users, interested individuals and/or an Administrator of the system may also collect parking citation information from private entities, for example, transportation companies, or any other organizations that specialize in transportation who may have access to issued parking citations. Other information from newspapers, blogs, social media, etc. may be collected and summarized by an Administrator of the system or employee of the system to supplement the database. This collected parking citation data may also be information as reported by Users to update, verify and supplement the database by real-time crowdsourced ticket information from Users. The historical data from the government and other sources mentioned herein may not be current and therefore, the system will use crowdsourcing to gather data that is current, updated, and readily available in real time from Users. Users may report ticket information with ticket images/scans for their issued tickets directly with the system from a mobile communications device or through the system's website. If the User takes a picture of the ticket to upload to the system database, the mobile application may allow the User to edit the image with an image editing function by covering/blurring sensitive information and/or sharpening the image by using optical character recognition prior to uploading the picture in order to increase the success rate for the computer to recognize the information in the image.

Each of the issued parking violation citations includes geolocations, one or more reasons, and time and date information pertaining to where and when the parking violation citation was issued. The illegal parking spots indicated on issued parking violation citations can be mined to infer the times, dates (e.g. hours of the day and the days of the week), and distances which a vehicle is prohibited to park at a given location. Parking rules applicable to commercial vehicles may not also be applicable to non-commercial vehicles, which necessitates the need to separate data from different types of vehicles into different categories so that the tickets may also be categorized depending on the vehicle and the violation reasons. The system may continuously collect, analyze, and update the various citation data to build a more accurate, up-to-date database.

Exemplary embodiments of the present invention may utilize combined raw data from various sources by creating a database and platform for Users to access collected information in a User-friendly, mobile device application interface. To build the Unified Database, raw parking ticket citation data may be obtained from Informational Sources which may be uploaded to a computer microprocessor and formatted to include only relevant information needed for running analyses and providing notifications. The uploaded citation data may be then split into two sets for cleaning and uploading into the system's server. The first set may be citation data which is already verified as having all the necessary information in the right format while the second set may be citation data which needs to be reformatted to include all the necessary information. Once all citation data has been cleaned, the address data may be extracted in a data frame to be used in a third party geocode API, for example, Google Geocoding API™, or SmartyStreets™, etc. to output a .csv file with all the geocoded information of locations relative to each ticket. The output may be reviewed and corrected by the Administrator of the system for accuracy and completeness. Parking signs data and RRLC data files may also be uploaded, cleaned and merged with the citation data into the Unified Database. The system may integrate algorithms to detect duplicate data if the tickets issued on dates and times that match those in the database may be labeled as duplicate data, which may be automatically rejected. However, tickets issued on dates and times not included in the database may be added to the historical database and notifications will be updated to reflect added data to properly alert Users with updated information.

According to an embodiment herein, the system then connects to the unified database to use the parking violation citation data and parking rules data to determine locations that are precluded for legal parking. The location and time information indicated on parking violation citation data is used to determine if a user has a future prospects of incurring a parking violation citation at a location and time preferred by the user for parking. The historical parking violation citation data is combined with real-time parking violation citation data to identify any applicable parking restrictions, whether limited by time frames or distance frames, etc. The processing module accesses the analyzed data to notify the users about locations of legal parking by precluding those locations with applicable restrictions at the time desired by the user to park. The system notifies the users about potential parking violations on the basis of the stored data reflecting a place where legal parking is available all the time, where parking is legal at a certain time frame and become illegal outside of the time frame, where parking is currently illegal but becomes legal in a certain time frame, and where parking is not allowed at all times. The system also identifies a plurality of legal parking options based on the data stored and analyzed in the unified database.

According to an embodiment herein, the system also identifies a user's parking intent though the user's vehicle location and speed. When the user shows a parking intent, the system uses the unified database to identify potential parking violations at the user's current location and current time. On determining a potential parking violation present, the system provides an alert about the potential parking violation and notifies the user of legal parking options in order to avoid receiving the parking violation citation. The system also allow user-assistance in paying for expiring parking meters, legal parking options, street cleaning precautions, school zone precautions, negotiations for parking spaces according to user needs, requesting and providing parking spaces, tow zone precautions and in-vehicle navigation system integration, etc.

According to an embodiment herein, while receiving alerts related to potential parking violations is helpful for a user to avoid the parking violation, the user does not fully eliminate the risk of committing a parking violation unless the user finds a legal parking alternative option. Therefore, exemplary embodiments of the present invention provide a platform for the collaboration and sharing of information regarding legal parking options. The parking data is processed from various sources that include, but are not limited to the government, government agents, municipalities, private entities, interested individuals or the users, websites containing useful information such as on-street and off-street parking facilities, capacity of parking facilities, hours of operation, prices, coupons, etc. When no historical data is available through sources mentioned above, then the data is collected and summarized by an administrator of the system or employee of the system to supplement the database. The collected parking data is also be supplemented by real-time crowdsourced parking information from the users.

According to an embodiment herein, there are several types of parking options are considered when looking for parking. The system uses a government parking which includes public on street parking and/or public garages, a commercial parking which includes companies with business licenses to operate private garages, and/or parking spaces for customer use only and a private parking which includes personal owners of parking spaces that rent out the parking space for a price or share for non-monetary exchange value. The system allows the users to report public garage waiting list information and/or share on street public parking through creating social connections. If allowed by law, monetary payment and/or non-monetary rewards may also serve as a consideration option for accepting parking related information.

According to an embodiment herein, the system enables the users to search for available, legal parking via GPS, based on the current location of the user in real time. The users search for legal parking at the desired destination, or legal parking opportunities while on the way to the desired destination. The users search for legal parking based on a profile they create, including the type of vehicle, type of vehicle plate, and duration of the parking, any special requirements, and other criteria.

According to an embodiment herein, the system enables the users to search for legal parking by time of the day according to their desired destination by filtering the parking criteria, including, but not limited to a parking garage or an off street parking location, a price, an on-street parking, the parking rules, the potential parking fine amounts, a parking fine frequency and likelihood, a historical parking violation activity, the towing charges, a booting and/or towing enforcement versus fines.

The exemplary embodiments of the present application utilizes a data collection system that employs an external data collection device, such as a cell phone, a tablet or any other mobile unit with certain functions, such as a camera and GPS, to capture and record the location of parking signs, parking meters, fire hydrants, bicycle, open parking spaces, available parking spaces, parking spaces that are becoming available, construction sites, etc. This system has an opportunity to reflect the changes in real time.

According to an embodiment herein, an online mapping data is incorporated into the system, and used in conjunction with an external data collection to identify the location and submit location information for collected parking related data.

According to an embodiment herein, the legal parking related data is processed from various Informational Sources. The legal parking related data provided as a public open data from the government agencies. The government legal parking related data is available through the applicable authority's website and/or publically accessible open data. However, when no open government legal parking related data is available, the system obtains the legal parking related data through the input from the users. An administrator also collects the legal parking related data from the private entities, for example, the private garage companies or any other entity that is authorized to manage a garage that offers legal parking. At some instances, the Administrator of the system hires employees to perform specific functions, such as for example, taking photos and videos of parking locations that are not available from open sources or other sources such as Google StreetView™.

The exemplary embodiments of the present invention adds to the database by using legal parking information as reported by the users to update, verify and supplement the database. The exemplary embodiments of the present invention continuously collect, analyze, and update the various legal parking related data to build a more accurate, up-to-date database. The system and method includes an incentive structure paired with an administrative quality control center to ensure a data quality and reliability of the information dispersed to the users.

The exemplary embodiments of the present invention crowdsource information about the legal parking options that reported by the users and/or collected by an administrator of the system. The crowd-sourcing is a distributed problem-solving method that utilizes online and offline resources to compile services, ideas, and/or content by the solicitation and/or capturing of data from a variety of people native to a special community that is targeted by the crowd-sourced subject. The crowdsourced information is used in gathering a current, updated, and readily available data in real-time in order to provide first-hand information through personal knowledge and/or experiences. The crowdsourcing is also effective in gathering the legal parking related information not provided by government data. The system utilizes an incentive method since the unified database incorporates the crowdsourced data from the users. The crowdsourcing relies on the participation of a large amount of people who are incentivized for their participation. Basically, the incentive method allows the users to post and share their information in the mobile application to gain credit. In this method, the user is rewarded based upon the user's proactive effort to report their parking information with efficiency, helpfulness, and accuracy.

For the purpose of crowdsourcing legal parking related information, the system includes a central server connected to an internet and the plurality of mobile devices, including but not limited to smartphones and in-vehicle navigation systems, capable of determining their geographic locations according to geo-location and transmitting legal parking related information into the central server system. The central server continuously updates the unified database related to the crowd-sourced data along with the data received from various Informational Sources. The central server further analyses the user reports and provides real time alerts to the plurality of users connected to a network through their mobile devices. Each input is assigned a unique tracking number and this unique number may be transmitted to the central server accompanied by the current position of the user/mobile communications device. The exemplary embodiments of the present invention promote transparency and accuracy for finding legal parking options in utilizing combined raw data from various sources by creating a database and a platform for users to access collected information in a user-friendly, mobile device application interface.

The potential user may be asked to register with the service by providing driver's license pertinent information such as their name, email address, plate information, and type of vehicle, the state/country issuing the driver license to create a user ID for each user of the mobile application. User IDs are necessary for the purposes of tracking reports and ratings made by each user. Credit card and/or debit card information may also be requested for subscriber fees for certain services the mobile application provides for a certified user. Certified users may be allowed to use various features of the mobile application which includes but is not limited to reporting information and rating information. The subscriber fees collected may also directly or indirectly constantly fund the monetary reward system in order to obtain reliable legal parking related information.

The system may include a user profile database configured to store user information and associations between each user and their mobile device after registering. Once registered, users may set and change their information in their user profile if necessary. For example, the user may change the type of vehicle they are currently driving in the case they switch vehicles if necessary. Additionally, users who do not possess a vehicle or are in somebody else's vehicle may still be able to use the system by selecting and/or changing vehicle type in the settings to assist the drivers. The system of the mobile application may recognize two types of users: non-commercial vehicle users and commercial vehicle users. Since different legal parking options may apply to non-commercial and commercial vehicles, users who indicate in their profile that they drive a commercial vehicle may be automatically marked in the different category for only commercial vehicles. Non-commercial vehicles may include but are not limited to: passenger cars, mini-vans, SUVs, etc. Commercial vehicles will be grouped based on the type of commercial plates—for example, plates issued by the Taxi & Limousine Commission, and type of commercial vehicle—for example, commercial sedan or commercial truck. This information is important to determine which rules apply to a specific type of vehicle. For example, certain types of vehicles with commercial plates, for example, trucks may be allowed to park or stand in some areas that allow for the loading and/or unloading of cargo, while other type of vehicles may not be allowed to park or stand at all.

Additionally, according to an embodiment herein, other vehicle identifying information may be provided and stored within the unified database, for example, overall size, height and weight, etc. The size of the vehicle may be useful when determining whether a certain vehicle driven by a user can be park at specific locations, such as indoor or outdoor parking facilities and/or be directed to locations where the vehicle may be legally parked according to their overall size, height and weight, according to an embodiment herein. Those who manage the parking facility may register their parking garage information with the system. There may be parking areas, for example private parking garages with indoor spaces that have an entry of a certain height or size, which may allow vehicles up to a certain size and height to park in the garage. Parking garages with outdoor spaces may accommodate those vehicles who do not fall within a certain size and height of an indoor parking garage. Users may also be notified of the cost, distance, and parking availability at these parking garages that have spaces to accommodate the user's type of vehicle.

Many users may also try to find parking at public parking garages because they are competitively priced compared to private parking garages since public garages are priced similar to on-street parking. Crowdsourcing may allow users to contribute parking related information in real time by reporting to the system and specifying the amount of vehicles already on the waiting list for a parking space, how long the user has been waiting, and the amount of waiting time required before a parking space may be available. The reports will contain a time-stamp that will let other users know that at the indicated time, there were how many vehicles on the waiting list, how long the user has been waiting, and the amount of waiting time required before a parking space may be available. This information may also be reported by employees hired by the administrator or third-party contractors who may be sent to monitor public parking garages during rush hours, for example during the holidays or weekends. Multiple reports regarding time consuming parking situations may deter other users from driving towards the public garage and look for alternative legal parking options. If users are notified of the amount of people and their long wait time, they may be less likely to head towards the public garage and will try to find available legal parking elsewhere. The private parking garages or commercial parking garages may have to register with the system to be able to report to the system if parking is currently available or unavailable and especially share relevant parking information.

The system may utilize a forum function in order for Users to report, in real time, the parking space availability at the location of the public garage. The forum function may be connected to the specific location where there is a public parking garage. The User can press on a location with a public parking garage within the map display to choose "Forum," to access the forum function which may include different categories where information may be exchanged between Users, for example, parking information; questions or answers or comments; and/or other categories not included in the above, if any etc. Public garages are subject to long lines and waiting times since they have a higher demand since it usually offers cheaper parking. However, drivers usually do not know if parking is available until they arrive at the public parking garage. Likewise, there is no information about availability on holidays or weekends. Information about the public parking garage may be obtained from government websites and may contain information such as for example, location, prices, operating hours, contact information, etc. The parking information category may allow Users to fully report the details regarding the parking situation at the specific public parking garage in real time by specifying the amount of vehicles already on the waiting list for a parking space, how long the user has been waiting, and the amount of waiting time required before a parking space may be available. If the waiting time exceeds a certain threshold, a notification may be sent to the users to notify them of the long wait time. Users may register to receive these notifications updates and/or other related information they are interested in for each public garage location within the system. The questions or answers or comments category may allow a User to ask any questions, input any answers, and input any comments related to parking situations for the location in addition to viewing all this information contributed by other Users. Other categories not included in the above may be added or deleted at the discretion of the Administrator of the system.

Commercial parking garages may utilize the forum function to advertise, post important information about the garage, for example, prices, hours of operation, pricing, availability, and any height, size, or weight limitations.

Users may utilize the forum function by posting to obtain more comprehensive and detailed information from forum posts which includes but is not limited to inquiries, responses, discussions, pictures, videos, written descriptions, and any other information that may be posted about the parking situation at the garage. The User inputted information may be open to comments and/or ratings from other Users. Comments with the highest endorsements may be given priority ranking for the position of the comment on a list. If endorsements reach a certain amount then the User may receive a credit or reward. Users can access the forum and all its contents from the mobile application regardless of the User's current location.

For quality control purposes, the system of the mobile application may integrate a verification system. The User may only rate the notification of potential parking violations or forum postings if the User has personally experienced firsthand and received such notification when a User's geolocation is indicated to be within a certain radius of the location with historical or real-time parking violation citation data which is the impact zone and generates the notification from the User who reported. Such Users who have received the notification based on their firsthand experience can either rate either positively or negatively depending on the accuracy of the information displayed.

The parking availability is dynamic because spaces may be occupied or unoccupied in a rapid succession throughout the day and it may be hard to reflect when a space is actually available or unavailable. Additionally, the spaces where parking is legal at a specific time of a day may become illegal at a different time on the same day or different day. Accordingly, exemplary embodiments of the present invention will alert users with several other types of notifications. This includes but is not limited to when parking is illegal according to the parking violation citation database and/or the rules, regulations, laws, and citations (RRLC) at any time; at a specific timeframe (e.g. 7 AM-7 PM), when parking may be legal but may become illegal at a different time outside of the timeframe; and when parking may be illegal at the current time but may become legal within a timeframe in the future, etc. From these situations, the database may be complimented with real time information provided by users and users may be alerted with a notification in advance to when the location the user parked at will become illegal to allow the user time to move his or her vehicle.

Through the collected and processed data, the unified database is used to preclude illegal parking spaces by using the input parking violation citation data, which results in an increase in chances of finding legal parking. The chances of finding legal parking are increased because usually, drivers will drive around randomly to find parking spaces within a certain distance of their intended destination and may not know where to go to find the best parking options. If drivers were informed of their options, drivers can save time by utilizing these parking options and also eliminate the risk of receiving a parking violation citation. Parking violation citation data may provide one efficient basis to advise users if they are allowed to park at a certain location.

The system may increase the user's chance to find legal parking by processing and analyzing data for three types of situations: when parking is legal all the time (no restrictions), when parking has limitation (e.g. hours, days of the week, months of the year, rules for certain types of vehicles), and when parking is illegal all the time because it is a no standing anytime zone. Some areas contain on street parking that do not have any applicable parking signs where parking is legal all the time. This is common to residential areas but may also exist in other areas. Usually on street parking will contain some sort of limitation which allows or disallows parking during either certain time frames of the day, certain days of the week, certain months of the year or may require a certain type of vehicle or permit to be allowed to park. The variety of possible restrictions is a cause of confusion for drivers as there may be multiple signs indicating different applicable rules. These areas may be precluded as legal parking options if the time falls within the provided illegal parking time frame. If the signs indicate that there are limitations, then the times outside the limitations in these areas will be shown as a legal parking option. Other on street parking that may be precluded at all times is areas where parking is illegal all the time because it is a no standing anytime zone.

The user may view the parking violation situation for the current time, a time frame, or a certain number of hours in the future at any location and at any time, for example by hour or half hour increments and, if parking is illegal, choose an alternative legal parking location. Therefore, the user may look into the current situation or the future situation at the location for when the user expects to arrive at the intended destination. The information on the charts can be changed depending on if the user indicates he/she is driving a non-commercial vehicle or a commercial vehicle. The user may also press on a specific location within the map display of the mobile application to view this information.

If there is information available in the unified database pertaining to the violation at the specific location, then a legal parking notification will be issued to the user. However, if the notification contains wrongful information and the user receives a ticket, then the user may report the ticket to supplement the database. This newly supplemented data will be used by the system to issue an updated legal parking notification to reflect the new data.

As the system of the mobile application records and stores accurate geo-location GPS coordinates (longitude and latitudes) of the mobile device, the notifications sent to a user can be customized and localized to the user's location within a certain radius. Notifications may be sent regarding alternate-side parking, as historically determined by authorities, for streets that do not allow parking during certain times due to government street cleaning services, which for example is usually applicable for half an hour (e.g. 9 AM-9:30 AM). The street cleaning parking restrictions often cause problems and are a disruption to one's schedule as they typically are a stated 30 minutes in duration on the sign but may in actuality take only a few minutes for the street cleaning vehicle to clean a street. Or the system may also inform users of temporary changes in alternate-side parking rules, e.g. when alternate parking rules are suspended to severe weather conditions, emergencies, holidays, etc. The system may connect with the internal clock mechanism of the mobile communications device to send an automatic notification, reminding the user to move their vehicle due to street cleaning rules. The user may set up and/or adjust one or more different advance reminder alerts with varying lengths of time. The alert may remain in effect until the user indicates they have seen the alert and/or moved their vehicle. The user may turn these alerts on or off in the settings of the mobile application. The system of the mobile application will have information on the exact location of where the user may have parked since the user may press a button on the display of the screen of their mobile communications device after they park to lock in and record their geo-location with the system.

Another function involving the optimal use of a parking space to avoid violations that relates to street cleaning regulations utilizes the concept that once the street cleaning vehicle cleans the street, a driver may then park on the street, regardless of whether for example, the 30 minutes or any other time frame on the street sign has passed or not. Although the municipality, for example the Department of Transportation, usually may specify a 30 minute time frame for street cleaning, in actuality, the street cleaning for a street may take up to a few minutes to perform. Thereafter, vehicles are free to park on the street once again. To efficiently utilize the parking space according to these principles, the system of the mobile application may notify users when parking is once again available on the street according to information that the street cleaning vehicle has finished cleaning the street. The system of the mobile application may provide these notifications by utilizing several sources of reported information. The Administrator may work together with a municipality to obtain available street cleaning schedule information, which may be used to notify users in the applicable area that the street cleaning has finished. Alternatively, the Administrator may work together with companies that perform the street cleaning, to obtain street cleaning schedule information and additionally have the companies report when street cleaning on a street has finished. The Administrator may also indirectly work with municipalities and/or street cleaning companies by having their drivers report when street cleaning on a street has finished.

The users may also contribute by registering with the system to not only receive notifications about the finished street cleaning for their street but also to provide real-time reports on when the street cleaning has finished for streets within their location. The system of the mobile application may be able to crowdsource information to obtain street cleaning times and other information. Reported information may be subject to a review and/or ratings by the Administrator and also other users to ensure that credible information is being collected to provide notifications. The users may be incentivized to provide reliable information as they may be rewarded for accurate information. Users may also be liable for any consequences from their reports with fraudulent information, which can be tracked using the identification used to register with the system. The Administrator may also hire an employee or third-party companies for the purposes of driving a vehicle that follows the street cleaning vehicles and provide real-time reports when the street cleaning has finished on a certain street. All these methods may optimize parking spaces by providing a way to monitor street cleaning vehicles so that users may be notified that they can subsequently park their vehicles within a short period of time once street cleaning is finished. This method saves a significant amount of time as users do not have to wait the full 30 minutes for street cleaning and may park their vehicle on the street immediately after being notified that the street cleaning vehicle has finished cleaning the applicable street.

Users may be less likely to receive a parking violation citation if they are informed of the potential violation they may receive if parked in a certain location that is subject to a restriction at the current time of parking. Users may be able to press a button on the mobile device display to check a particular location or current location where the user is located to find out whether parking in this location is legal. If there is no previous information or notification from parking citation data available for the location, then the user may see on the notification that parking may be suggested. However, there may be another three situations. First, the system may be wrong and a user may find out that there is actually a potential parking violation. Second, the system may be wrong, a user follows the system's instructions in the notification, and the user receives a ticket. Third, the parking is actually legal and the user does not receive a ticket. If the system is wrong and a user finds out that there is actually a potential parking violation, the user may report the inaccurate information, submit correct information which will be subject to ratings, and may receive a monetary reward. The administrator may send an employee or other user to verify this reported information. If a user does not receive a notification and subsequently receives a ticket, the user may report the ticket so that the information on the ticket can create new notifications and supplement the database. The report will be subject to ratings and the user may receive a monetary reward if the positive ratings reach a certain threshold. These way users will be encouraged to report parking and ticket information to help build the database, which may be supplemented by other users and subject to ratings.

Exemplary embodiments of the present invention may also calculate parking space restrictions based on school zone information. School zone parking restrictions may prohibit parking within a certain distance and/or around a designated area where a school is located due to public safety for students who may be commuting to and from school. The parking restrictions may be indicated by parking signs or by markings on the street. These parking restrictions may apply during a certain time, for example during certain dates of the school year where school is in session and/or during certain times within the days that school is in session. During the time sensitive restrictions, parking in the designated areas in and around the school may be prohibited. School zone parking related data may be entered into the unified database. This data may be obtained from various sources, which include but are not limited to the government, school district administrations, after-school organizations, and/or school websites etc. This data may also be reported by users, for example, parents of the children who attend the school may report the times and dates the school zone parking restrictions are in effect. The system may process the data and preclude these areas as legal parking options when school is in session as parking is not allowed. The system may also include these areas as legal parking options when school is not in session or when the school zone parking restrictions do not apply if indicated by other available verified information. Accordingly, users may receive notifications regarding potential parking violation citations when showing an intent to park in a designated school zone area during the restricted times.

Reported information may be subject to a review and/or ratings by the Administrator and also other users to ensure that credible information is being collected to provide notifications. Comments, suggestions, etc. may be listed in the forum according to ratings, and the ones with the highest amount of positive ratings will be listed at the top. Users may be allowed to report to the Administrator any information they may deem inaccurate. The Administrator may be able to open a case where an employee and/or user may be sent to conduct an investigation of the purported inaccurate information to verify the quality of the information. Rewards may be provided for the user of the mobile application who may have assisted in the investigation.

The mobile application may alert the user about illegal parking spaces through email, text message, phone call, phone alert, voice mail etc. automatically at the choice of the users who set this in advance in the settings of the system. Functionalities within the system of the mobile application, notably the user reporting function, may connect to third party APIs to provide voice-to-text capabilities. Users who utilize the voice-to-text function may record their voice by speaking their statements into the microphone of the mobile communications device, which the system may change to text within the mobile application. Accordingly, users may not necessarily have to enter information manually and may submit information to the system by recording their voice statements.

Exemplary embodiments of the present invention may therefore provide an informational and educational function, where the system of the mobile application provides notifications that will give specific reasons and suggestions on how to avoid the same violation and displays the historical summary of the violation to persuade the user to not take a chance at parking in a location with parking violations and so the user may know about the violation in advance.

However, in order to eliminate any risk of receiving a parking violation citation, a user may be required to find alternative legal parking options. Exemplary embodiments of the invention may provide a method and system for finding legal parking, as it is necessary for a driver to find a legal parking space in order to completely avoid a potential parking violation. Therefore, exemplary embodiments of the invention may provide legal parking alternative options once potential violations for the specific location are determined.

When the system is in operation, it may track the geo-location of each individual user while driving, along with the user's speed, in which a slow speed of 1-3 mph, for example, may be indicative of the intent to park within a certain radius of the intended destination as preset by the user. Based on the user's geo-location and speed, the system may send an inquiry to the user and ask for example, "Parking?" If the user chooses "Yes" then the system may notify the user of any parking violations within that location, provide advisory alerts on how to avoid receiving parking violation citations or provide alternative legal parking options if violations are present. To generate a notification, the system may query different data sets within the unified database for example, RRLC applicable to the location; any administrative notices or temporary notices applicable to the location, and, if parking illegal, suggest alternative parking options. If the user does not respond to the alert after a certain time, for example, 3 seconds then the inquiry may disappear automatically. The user may receive an inquiry for the intent to park only when the user's geo-location is within a certain radius of the intended destination, which may be a certain number of feet as set by the user. The user may also set the amount of instances, for example once, twice, none etc. they would like to receive an inquiry for the intent to park within the radius. If the user does not respond to the notification, the system may stop sending the notification after it reaches the number of instances previously set by the user. The alert may appear on the display of the mobile device or may include the option for a voice alert.

If the user chooses "Yes" when asked about their intent to park, and the mobile application notifies the user that the space does not allow parking by sending a subsequent notification, the mobile application may be able to accurately and clearly direct a user to other available, legal parking options by sending a follow-up inquiry to the user, for example "Parking Options?" If the user does not respond to the alert after a certain time, for example, 5 seconds then the inquiry may disappear automatically. If the user responds "Yes", the system of the mobile application may then use the user's current geo-location as a starting point to find feasible parking based on the user's preferences and information obtained through third parties. This function is also available when a user presses a button on the display of the mobile communications device. The results may provide the user with information on, for example, nearby parking spaces, government/public, commercial parking garages, or private garages where the user can legally park. They may be ranked according to the best price with the time it takes to drive to the garage or shortest time with an ETA calculated based total time needed for both driving to the parking space and the walking distance to the intended destination using the current driving speed. These parking options may be listed with information from third parties, whether government/public parking, commercial parking garages, or private parking garages, which may have registered their parking garage information with the system (i.e. name, address, price, hours of operation, availability, and height, size, or weight restrictions, if any). By having parking garages register their information with the system, the garages can also indicate in real-time whether parking is available currently or if the garage is full so the system may indicate this when notifying the user. If the parking garage is full, then it may not be displayed as an option. Additionally, when the user is viewing the list of alternative parking options, the user may press on the name of the garage whereby the mobile application may automatically start routing the user from the user's current location to the parking garage. Users may also be allowed to pay for parking directly through the system if allowed through a third party API that connects to the applicable parking garages payments systems and/or website.

The results may provide the user with information on, for example, nearby parking spaces, public, commercial parking garages or private garages where the user can legally park. They may be ranked according to the best price with the time it takes to drive to the garage or shortest time with an ETA calculated based total time needed for both driving to the parking space and the walking distance to the intended destination using the current driving speed. These parking options may be listed with information from third parties, whether government parking or private parking garages, which may have registered their parking garage information with the system (i.e. name, address, price, hours of operation, availability and any height, size, or weight restrictions, if any) or the system may have collected this information. By having parking garages register their information with the system; the garages can also indicate in real-time whether parking is available currently or if the garage is full so the system may indicate this when notifying the user. If the parking garage is full, then it may not be displayed as an option. Additionally, when the user is viewing the list of alternative parking options, the user may press on the name of the garage whereby the mobile application may automatically start routing the user from the user's current location to the parking garage. If the system shows that the parking garage is unavailable, the system may indicate the approximate waiting time for the garage to become available and, at user's discretion, routing to alternative parking facility. Users may also be allowed to pay for parking directly through the system if allowed through a third party API that connects to the applicable parking garages payments systems and/or website.

According to an embodiment herein, the users may set the time the parking meter may expire and also at what time the mobile application may remind the user. The system may track the time by connecting to the internal clock mechanism of the system. The user may also use this function to provide advance reminder alerts about street cleaning times to assist the user by reminding them to move their vehicle. The user may set up one or more different advance time reminder alerts with varying lengths of time. The amount of time for the advance reminder alert can be adjusted by the user. The user can choose for the alert to be sent by various options including but not limited to a call, text message, and voice message, or email etc. Once parked and when applicable, the mobile application may allow the user to set an alert about when the parking meter may expire because people may forget and need to be reminded.

The system provides a platform for users to set a binding but negotiable price for parking spaces and/or refilling parking meter services. This places a focus on what users want and allows for one-on-one negotiations between individuals. The one-on-one connection allows for back and forth negotiations which is distinguishable from offers that must be accepted or rejected.

According to an embodiment herein, the users may be allowed to provide a demand through the system for parking based on their specific needs, which may include a certain amount of time in a certain area or distance for a certain price. User(s) who are looking for parking may be Demander(s) while the users who provide parking spaces may be Provider(s). The Demander may send a message with their demand as an offer of invitation to solicit a response from other users, Providers, who can meet the demand, which may be the best deal a user can receive and is binding upon both users. Providers may either accept or respond with a counteroffer. Demanders may accept the counteroffer or submit their own counteroffer. The relevant parties may negotiate until the terms are set and agreed upon by both parties. The demand may disappear if there is an acceptance completing a deal. An accepted offer or counteroffer may be binding upon both parties. For payment integrity purposes, the system may monitor the transactions and may require a deposit to be paid or the credit card information stored in a user's profile may be used for the binding transaction. This method works in two directional ways where a user may either request to receive offers for parking spaces or other users may provide offers for available parking spaces which may be accepted by users looking for available parking spaces. Even a user who may have rejected an offer may still retract their rejection in order to accept an offer and complete an agreement. Offers may be listed in a certain order through different options such as best price, distance to intend destination, parking hours, or time spent to drive to the parking space.

For example, a user (e.g. User 1) may post a demand through the system for a continuous parking space for duration of 10 hours for $15 in the area of Queens, N.Y. Those who have the authority to manage parking spaces or parking garages in Queens, N.Y. and are registered with the system, may see this demand and based on their own availability, pricing, and/or other factors affecting parking space availability, may make an offer to User 1 with details on how long they can provide a space, pricing information, and the location of the parking space/garage. Another user, for example User 2 may see User 1's demand and offer User 1 a space at User 2's garage in Queens, N.Y. to negotiate for $20 for the 10 hours. A third user, for example User 3 may offer User 1 a space at User 3's garage in another area of Queens, N.Y. for $30 for the 10 hours. User 1 may have several options when viewing these offers. User 1 may, for example, decide to message User 2 or 3 to make a counter-offer and negotiate the terms of the pricing or duration depending on User 1's needs. For example, User 1 may ask for a cheaper price from User 2 because User 1 would prefer to make a deal with User 2 since User 2's garage may be in a more convenient area for User 1. Accordingly, users may communicate back and forth until the terms are agreed upon by both parties. Final prices will be kept confidential and will not be disclosed any third parties to the deal. User 1 can also decide not to answer these offers and wait for other possible offers from other users. Additionally, whichever user accepts User 1's offer first may complete the deal and all other users will be precluded. If no other users accept the offer, then the cycle may begin again where User 1 can initiate another demand with a different price, which may create an acceptance from another user, resulting in a successful deal. Communications within the system of the mobile application between the user who needs a parking space and the users who can provide a parking space includes but is not limited to, live-chat, messaging, and any other form of communication as allowed by the Administrator of the proposed Application.

This function for negotiating parking space prices and availability may also be available by pressing a button on the screen of the mobile device to indicate a parking intent. When showing parking intent, a user may specify that the user is finding parking now or a certain time in the future where the user needs parking when the user is at the intended destination. Indicating a parking intent will prompt the system to lock the user's location and to send a notification to the Users who have the intent to leave and may be matched with the original user who wants to park. Indicating a leaving intent will also prompt the system to lock the user's location and to send a notification to the users within a certain radius of the original user who have the intent to park. Either indication of parking intent may allow any potential Providers to send offers with relevant parking space information to the user who is trying to find a parking space. Matching users will make full use of the social media feature as users will connect in order to successfully send and receive offers within the platform of the system. Additionally, another main purpose of matching and connecting users with a parking intent or leaving intent is to allow users to communicate with other users with a specific purpose without having users randomly approach or drive around to ask if drivers are leaving. This method will save time as users will approach other users with a specific purpose of assisting each other. Socially connecting users also promotes future transactions between the users due to prior successful parking transactions. Users may be able to control whether or not they receive these notifications by either turning this function on or off in the settings of the system. Social connections are also helpful because the government may not allow for the exchange of parking spaces for a user's monetary gain. However, if allowed by law, the system may also allow for monetary payment and/or non-monetary rewards as a consideration option for accepting parking related information.

A leaving intent of the user is also identified by determining and analyzing the speed and location through the accelerometer and the location identifier respectively. When the system detects motion after a vehicle has been in park, it may track the geo-location of each individual user along with the vehicle and/or user's speed, in which a change in acceleration or change in location will trigger the system to recognize a leaving intent. Based on the change in acceleration and change in location, the system may then send a notification to the user to ask if the user is leaving a parking space, for example, "Leaving?" If the user chooses "Yes" then the system may find other users within a certain radius of the current user's location who are showing a parking intent or users who request to be connected because they are looking for parking. The system may allow for them to connect with each other as consideration for offering and accepting a parking space. However, if the user does not respond to the alert after a certain time, for example, 3 seconds then the inquiry may disappear automatically.

Users may also press a button on the screen of the mobile device to show a leaving intent and specify that the user is leaving now or leaving at a certain time in the future.

Parking spaces are often spaces with limitations related to the size of the vehicle. When offering and demanding parking spaces in general, users may indicate the type of vehicle they are currently driving or is currently parked in the space. The system may then compare the relative sizes of the vehicles to determine if the vehicle a user is driving may fit in the parking space. There may be three applicable categories, for example, bigger vehicles, same-size vehicles, and smaller vehicles. A user with a certain sized vehicle may only allow another user with the same vehicle category or a smaller vehicle category. For example, a user's parked four-door sedan may be classified as a regular type vehicle or a certain size. Another user driving a minivan may not be allowed to park in the user's space because a minivan may be categorized as a bigger vehicle, which may be too large to fit in the parking space. Only same-size vehicles and smaller vehicles may park in the space.

For privacy purposes, if users do not want to reveal their actual location, users may choose in the settings to reveal their location within a certain distance, for example within 100 feet of their actual location. If the user wants to complete a transaction, the user may then reveal the location to the other user in order to complete the transaction.

The users may set the time the parking meter may expire and also at what time the mobile application may remind the user. The system may track the time by connecting to the internal clock mechanism of the system. The user may also use this function to provide advance reminder alerts about street cleaning times to assist the user by reminding them to move their vehicle. The user may set up one or more different advance time reminder alerts with varying lengths of time. The amount of time for the advance reminder alert can be adjusted by the user. The user can choose for the alert to be sent by various options including but not limited to a call, text message, and voice message, or email etc. Once parked and when applicable, the mobile application may allow the user to set an alert about when the parking meter may expire because people may forget and need to be reminded.

Another functionality in the system of the mobile application may allow users to obtain or offer assistance to/from other users in refilling parking meters if users cannot refill the parking meter by themselves. The users may choose in the settings of the mobile application to allow or not allow access to the function of assisting others. Allowing access may include the disclosure of the user's current location information and allow for messages to be received/exchanged regarding requests for assistance in refilling parking meters. Messages may only be sent and exchanged between those users who allow access to this function. This may be changed according to the user's preference. After a user parks the vehicle, the user may press a button on the screen to lock in their geo-location, which may be stored in the memory storage of the database. The system may obtain the applicable parking meter fees and meter location from government websites and input this data into the database so the user may know how much the meter costs. Once the system sends the user a reminder alert about the expiring parking meter, the user may refill the meter themselves by either using the mobile application which may connect to the applicable third party website for meter payment or go to pay for the parking meter; and if they are unable to do so, the user may ask for assistance from other users in paying for expiring meters by sending a message with a request to other users who are currently located within a certain radius of the location of the original user's vehicle which geo-location was locked when the user parked, to ask for their assistance in paying for their expiring meter that details the amount needed to fill the meter and also the service charge the user is willing to pay. This function may be very useful because paying for other user's assistance in refilling the meter is cheaper than paying for a parking meter ticket. For example, if a user realizes that the parking meter is running out of time and cannot refill the meter for reasons out of the user's control, the user may use the mobile application to send out a message to other users within a certain radius of the location of the parked vehicle as set by the user, with information on the monetary offer, such as, "I will pay $5.00 if you can refill my parking meter, which is $3.00 for the parking fee and a $2.00 service charge." The exact location of the vehicle may be sent with the message, which was recorded by the mobile application when the user has parked. Other users can see the message and decide to either accept or make a counteroffer with different amount and/or terms (i.e. "I will refill your parking meter for $6.00 which is a $3.00 parking fee and a $3.00 service charge), or choose not to respond to the message. The other user who accepts offer first may be allowed to complete the transaction. Once a user accepts, all other users who try to respond may be automatically rejected by the system. Both users may communicate by using internal communication functions including but not limited to, live-chat, messaging, and any other form of communication as allowed by the proposed mobile application. Once the terms are offered and accepted, the users complete a transaction and must perform according to their agreement in the message.

Alternatively, a user, for example User 1, may also offer to help refill parking meters with a certain price that has been set in advance which may be approaching expiration for a fee by sending a message to other users whose parked vehicle locations are within a certain radius of User 1's current location. User 1 may send out a message through the system with an offer that may include the amount User 1 would like to receive as a service charge. This service charge may be negotiable. Additionally, the Administrator may hire employees to use this method to send out messages with offers to help refill parking meters for a fee.

To control payment and integrity, the original user may put the total amount of money in an escrow account created by the system of the mobile application or the option of transferring funds directly to the user. The other user who accepts the offer may receive notification regarding the deposit of funds in escrow and may then refill the meter before it expires. Once refilled, the other user must provide proof of payment in the form of an accurate photograph that may include the vehicle plate number, filled meter, and/or paid meter receipt as evidence. Once the photograph is uploaded into the mobile application, the original user may verify the photograph and may release the payment placed in escrow, which may be credited to the other user's account. This method incentivizes both users because the original user may avoid receiving an expired meter violation ticket and the other user may earn extra money through the service charge. There may also be a dispute resolution function incorporated to resolve any disputes between users. Both users may rate each other upon completing the transaction.

Exemplary embodiments of the present invention may allow the system of the mobile application to notify users when a parking space is not available for parking because another user is already parked in the space. To allow for this notification, the system may record and store user's geo-location when user parks in a space and presses a button on the display of the mobile device to lock their vehicle location. For every user who presses to lock their location, the electronic map may indicate an occupied parking space with a colored dot or other format indicator (e.g. dots of varying sizes, circles of varying sizes, lines, etc.), for example a red colored dot, to show other users who are viewing the map, that another user is currently parked in a particular space. Solid lines, for example solid red lines may be used to indicate that parking is illegal in the particular street. Red colored dots for example, may be used to indicate occupied parking spaces while green colored dots for example, to show potentially available parking spaces. The spaces and streets on the electronic map may dynamically change colors based on the citation database and parking rules. Although this method may require many individuals who use the mobile application, the method may nevertheless increase the chances for a user to find parking by letting users know where parking is unavailable, which saves time instead of driving around randomly in search for a parking space. The more people become users of this mobile application, the more accuracy the method will provide in assisting users in finding legal street parking spaces and preventing parking violation citations.

Additionally, exemplary embodiments of the present invention may include social media functions of an original social media system within the mobile application, or the integration of other third party social media applications currently available (for example, Facebook™) to help increase a user's chance of finding parking in a certain location through connecting users. As public parking spaces are government property, the public may not make money by obtaining monetary incentives to give up their parking spaces. Accordingly, allowing users to connect through social media within the mobile application provides a non-monetary incentive for users to share information about when they are leaving their parking space. The social media feature additionally serves as consideration for users to connect and exchange parking related information. The users may connect within the mobile application when a user, for example User 1, would like to provide another user with their current parking space. This may occur in two different situations. The users may request for parking from other users. If a user, for example User 1, is looking for a parking space in real time, he/she may send a request from their current location to another user, for example User 2, whose vehicle is parked at the location closest to User 1 who shows an intent to leave. If User 2 rejects the request or does not respond, then the request may be sent to the second nearest user, for example User 3, and so on and so forth until the request is accepted or dismissed. A user who has rejected the request may decide to retract their rejection and subsequently accept the request from User 1. The request and acceptance cycle may continue until eventually, User 1 may be navigated to the parking space of another user whom connects with User 1 by accepting the request. However, if User 1 is looking for a parking space at some time in the near future, e.g. 10 minutes, the User may send a request through the system to other users who are parked within a certain radius of User 1's location. The user who responds to the request first, may socially connect through the system and User 1 may be navigated from their current location to the location of the user who first accepts the request. Users may retract their rejection and still accept if the request has not been accepted by anyone else.

Users may also offer their parking spaces to other users. If a user, for example User 1, is offering their parking space in real time, he/she may send a notification to another User, for example User 2, who is in the closest proximity to User 1's location and is looking for a parking space. If User 2 does not respond, then the offer may be sent to the second nearest user, for example User 3, and so on and so forth until the offer is accepted or dismissed. A user who has rejected the request may decide to retract their rejection and subsequently accept the request from User 1. The offer and acceptance cycle may continue until eventually, the user who accepts the offer may be navigated to the location of User 1's parking space. If User 1 is offering a parking space at some time in the near future, e.g. 10 minutes later, the request is being sent to users who are within a certain radius and are looking for a parking space at that time frame in the near future. As soon as another user accepts the offer, directions may be provided by the navigation system and the request disappears from the system. Users may retract their rejection and still accept if the request has not been accepted by anyone else. The notification User 1 sends may include the type and size of the vehicle according to User 1's profile, and may only be sent to other users with same or smaller vehicle sizes according to those users' respective profiles. Information on the type and size of the vehicle may be adjusted according to the parking space available. Once connected, the system of the mobile application may then guide the other user to User 1's available parking space. In the situation where the user within the closest proximity of User 1's parked vehicle is notified of a potential open parking space and declines to connect with User 1 to reveal the parking space location or does not respond within a certain amount of time, then the notification may disappear and be sent to the next user who is within the closest proximity. Alternatively, the notification may also disappear from the screen once User 1 brings the vehicle in motion and leaves the location. Users may also freely create or remove social connections manually within the mobile application according to their preferences.

Exemplary embodiments of the present invention may be used by the public and/or computer systems in general. Some examples include but are not limited to: vehicles, driverless vehicles, websites, in-vehicle systems, Global Positioning Satellites (GPS), and/or other electronic systems. Exemplary embodiments of the present invention may also be implemented as a mobile application of a mobile communications device, which may include smartphones, tablets, laptops, desktop computers, in-dash vehicle systems, etc., and may also be expanded to encompass other systems or services which may process, utilize, and display the legal parking related data. Online mapping systems, global positioning system (GPS) or mobile communications device manufacturers, wireless service providers, mobile application creators and developers, etc. may greatly benefit from the information disseminated by various exemplary embodiments of the present invention.

Exemplary embodiments of the present invention can be integrated with in-vehicle systems to enable the system to fully function within a vehicle. This integration is not limited to in-vehicle systems and may also be integrated in the vehicle by original equipment manufacturer or third-party add-on equipment that may be mounted within a vehicle. Exemplary embodiments for direct integration of the disclosed legal parking space information system can be integrated directly into the navigation and GPS System in an onboard mobile device of original equipment manufactured vehicles and into a vehicle's navigation device.

When integrated into an in-vehicle navigation system, the vehicle's display may be used to show notifications in accordance with exemplary embodiments of the present invention as described above. Remote updates and communications to the user can be provided through the installed disclosed legal parking related information application on the user's mobile device to alert the user for example, when the parking time limit is approaching expiration, when street cleaning is finished, and/or alternative legal parking options based on the user's current location. When a user arrives at a parking spot, the system may lock the vehicle's location and may send a notification to a user's device to remind him about the approaching parking meter expiration when applicable in addition to other relevant restrictions.

Integration may include utilization of vehicle equipment, for example speedometer, accelerometer, cameras, inertial sensor, gyroscope sensor, GPS sensor, and any other applicable equipment, etc. Utilization of this vehicle equipment may be used to obtain comprehensive real-time and historical activity information about the vehicle, for example its direction, speed, orientation and acceleration, etc. in order to issue applicable notifications for users.

In the description of the figures below, it is understood that the details described above may be combined with, or may be used in place of similar attributes described below and that the figures are used only to illustrate particular the invention. It is to be understood, that for the purpose of providing simplified figures that are easy to understand, many of the details above have been omitted from the figures, however, it is contemplated that the details described above may be incorporated into the approach of the description below in any feasible manner.

FIG. 1 is a diagram illustrating a unified database in accordance with exemplary embodiments of the present invention. With respect to FIG. 1, the data sets are categorized according to non-commercial vehicles data set 102 and commercial vehicles data set 107 in the unified database 101. Non-Commercial Vehicles Data Set 102 includes non-commercial vehicles historical parking violation citations data 103, non-commercial vehicles real-time crowdsourced parking violation citations data 104, non-commercial vehicles parking rules and abbreviations data 105, and other non-commercial vehicles data relevant to non-commercial vehicles data 106, such as type of vehicles, type of vehicle plate and other data related to non-commercial vehicles. Commercial Vehicles Data Set 107 applies to commercial vehicles only that includes type of vehicles, type of vehicle plate and other data related to commercial vehicles, which includes commercial vehicles historical parking violation citation data 108, commercial vehicles real-time crowdsourced parking violation citations data 109, commercial vehicles parking rules and abbreviations data 110, and other commercial vehicles data relevant to commercial vehicles data 111 such as type of vehicle and type of vehicle plate. The central server may retrieve data stored in user-information data set 112 that includes user-information data, such as type of the vehicles, type of vehicle plates, etc. Additionally, user-information data set 112 is also used to store user profiles, settings, preferences, type of vehicle, type of vehicle plate, user-input reliability and prevent system abuse.

Once standardized and made unambiguous, the central server may interpret the parking violation data from the unified database 101 to understand a set of rules that appear to govern the enforcement of parking violations in a specific area. These rules may be mathematical functions that take as input, location, day and time, and provide as output, an indication as to whether the provided location, day, and time is associated with parking violations. These rules may be stored in a parking rules data set for non-commercial vehicles 105 and commercial vehicles 110. The non-commercial vehicles violation data set 102 and the commercial vehicle violation data set 107, which includes type of vehicle and type of vehicle plate, may be retrieved to generate the corresponding notifications to users. The parking rules and abbreviations data set for non-commercial vehicles 105 and commercial vehicles 110 may be retrieved to help standardize parking violation data, as this data may tend to utilize various abbreviations and jargon that may be particular to certain sources. Other data 113 relevant to providing effective alerts may also be input into the unified database 101.

The unified database 101 may also include weather-related data to connect with locations containing violation data. Historical weather data 114 may connect to historical citation data to find existing information about the correlation between a certain weather occurrences and parking violations. For example, during snow emergencies, designated legal parking locations may be illegal due to emergency services necessary to remove snow, etc. The historical weather data 114 may connect with non-commercial vehicles historical parking violation citation data 103 and commercial vehicle historical parking violation citation data 108 to obtain correlation information, which may be used with real-time weather data 115 to determine if a notification will be sent to users whose current location indicates the user may be subject to weather-related parking advisories.

The unified database 101 may also have commercial parking data 116, which includes but is not limited to location, price, availability, etc. Private parking data 117 and public parking data 118 are also included in the database for system to display on an electrical map.

Figure 2A:
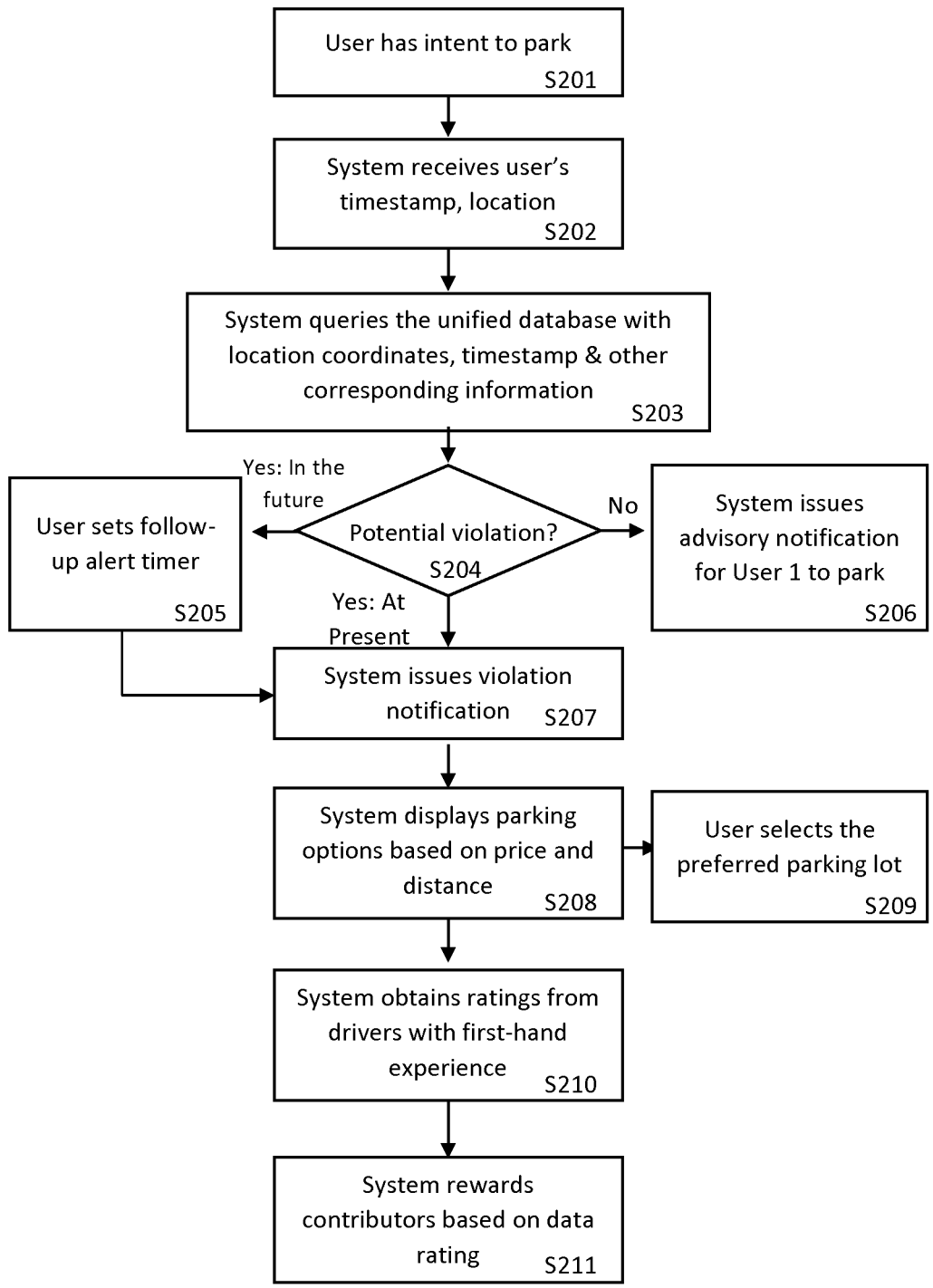
FIG. 2A is a flow chart illustrating how the system generates the corresponding advisory notifications based on data collected by the system from the user in accordance with exemplary embodiments of the present invention.

FIG. 2A is a flow chart illustrating how the system generates the corresponding advisory notifications based on data collected by the system from the user in accordance with exemplary embodiments of the present invention. With respect to FIG. 2A, in the event that driver has the intent to park (Step S201), the system may then determine the current time and location (Step S202). The unified database 101 may be queried to determine whether the driver's location and time and other correspond to information about prior parking violations (Step S203). The system detects potential violation based on the unified database 101. Where it is determined that it is not a potential violation (No, S204), then the system will issue advisory notification for allowance of parking for that location (Step S206). Where it is determined that citations have occurred at the location at the present time/day (Yes: at present S204), then a notification may be issued (Step S207). Where it is determined that citations have occurred at the location at a time/date in the near future (within a period of time that one is likely to be parked for) (Yes: in future S204), then one or more follow-up notifications may be set by the user (Step S205) so that the User may be notified by the system (Step S207) to remind the user of the need to move his or her vehicle prior to the time or day in which parking violations have occurred.

As discussed above, the top-ranked suggestions for alternative parking options may be displayed (Step S208). These suggestions may be listed according to the best price with the amount of time it takes to get the destination, or the shortest time consumed to get from the current location to the final destination that may include driving and walking time, with the price. The user selects the preferred parking spot (Step 209). A user may also be allowed to rate the notification sent by the system (Step S207). The central server may obtain ratings from drivers with first-hand experience (Step 210). Based on the ratings reaching a certain threshold, the system may rewards those users who contributed to the notification, which is partially based on user-reported ticket information (Step 211).

Figure 2B:
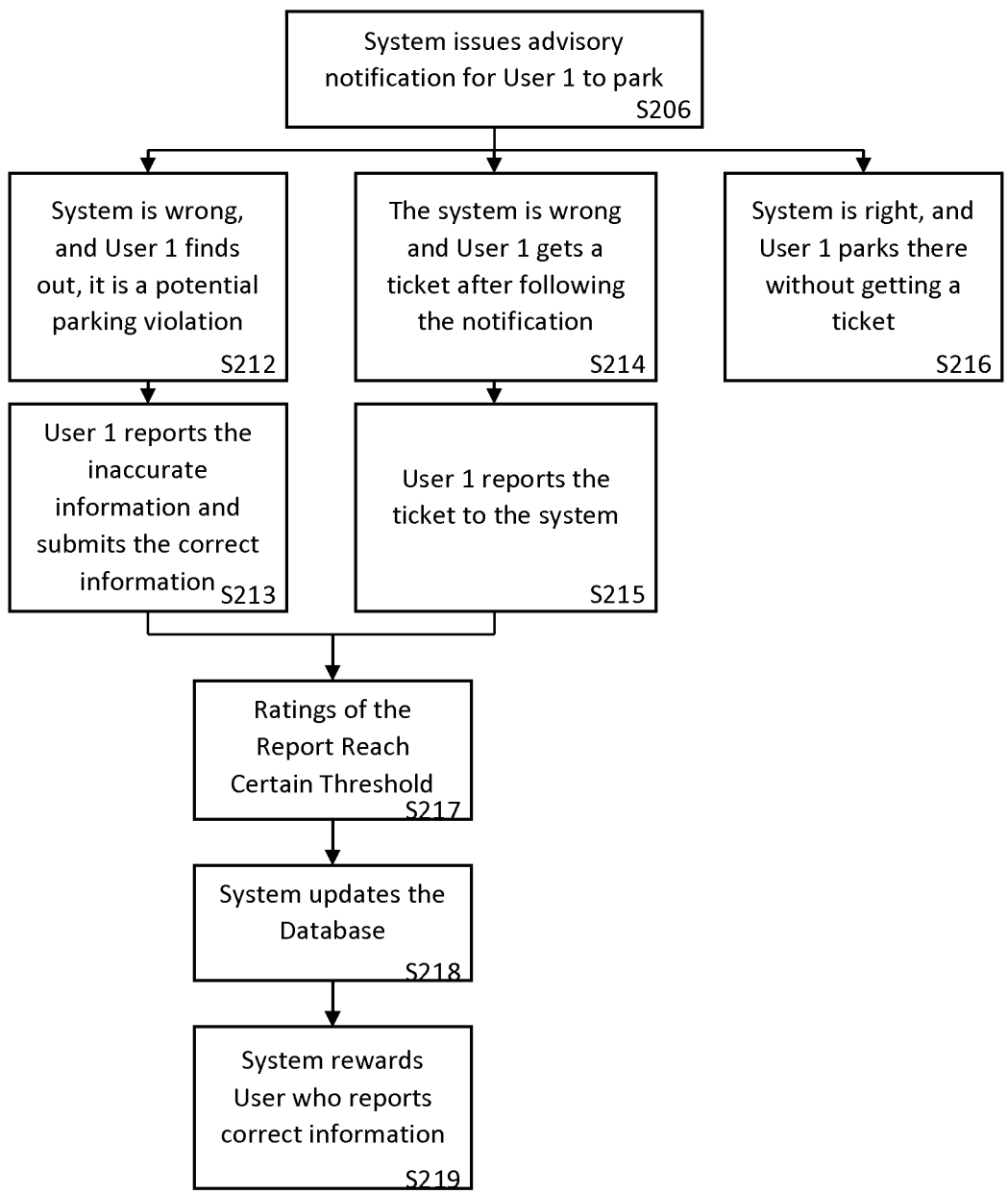
FIG. 2B is a flow chart illustrating three situations after users get advisory notifications from system, in accordance with exemplary embodiments of the present invention.

FIG. 2B is a flow chart illustrating three situations after users get advisory notifications from system. With respect to FIG. 2B, when User 1 is approaching specific parking spot with no previous parking violation information at this spot, then the system will send parking advisory for User 1 to park (Step 206). After that, three different situations may occur. First, the system may be wrong and a user may find out that there is a potential parking violation (Step 212). Second, the system is wrong, the user follows the system's instructions in the notification, and the user receives a ticket (Step 214). Third, the parking is legal and the user does not receive a ticket (Step 216). If the system is wrong and a user finds out that there is a potential parking violation, the user may report the inaccurate information and submit correct information (Step 213) that will be subject to ratings. The user may receive a reward. If system is wrong and User 1 subsequently receives a ticket (Step 214), the user may report the ticket (Step 215) so that the information on the ticket can create new notifications and supplement the RRLC database (Step 218). The report will be subject to ratings and the user may receive rewards (Step 219) if the positive ratings reach a certain threshold (Step 217). Only a user with first-hand experience can rate the report.

Figure 3A:
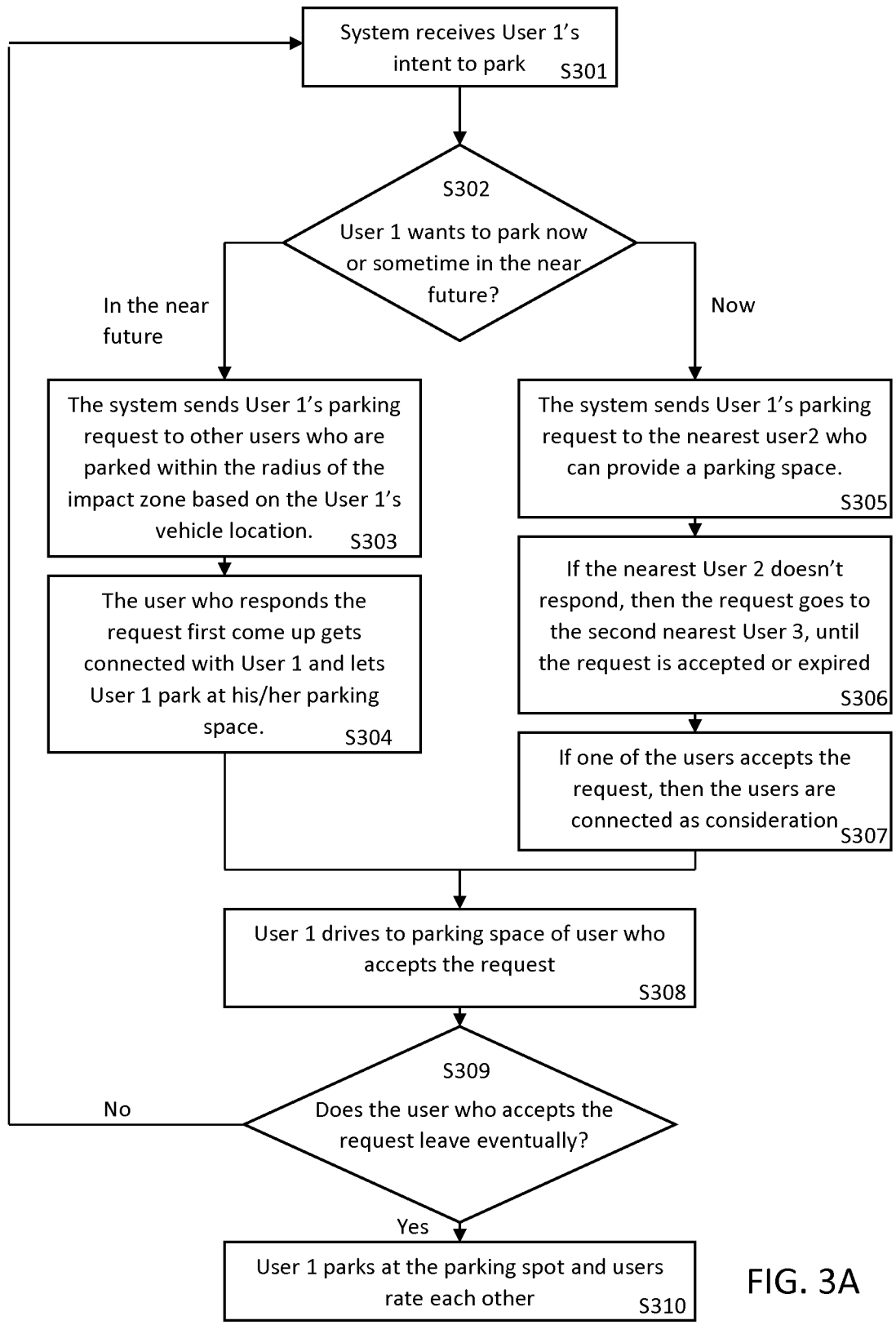
FIG. 3A is a flow chart illustrating an approach for users to post their parking request to the system and system guides users to find a match and/or navigate the users who post requests to find a parking spot in accordance with exemplary embodiments of the present invention.

FIG. 3A is a flow chart illustrating an approach for users to post their parking request to the system and system guides users to find a match and/or navigate the users who post requests to find a parking spot in accordance with exemplary embodiments of the present invention. As discussed above, exemplary embodiments may be used to find a match and/or generate a notification when a driver shows intent to find a parking spot. With respect to FIG. 3A, a User 1 may send a parking request to other users through the system (Step S301) and User 1 advises the system to park now or sometime in the near future (Step S302). If User 1 wants to park in the near future, then the system will send User 1's parking request to other users who are parked within the radius of the impact zone based on User 1's vehicle location (Step S303), and the user who responds to User 1's request first may be connected with User 1 and subsequently will allow User 1 to park at his/her parking space (Step S304). The radius of the impact zone may be set by the system or may be adjusted by users. If User 1 needs to park now, then the system sends User 1's parking request to the nearest User 2 who provides a parking space (Step S305). For example, User 2 is the nearest user, and if User 2 does not respond, then the request goes to the second nearest user (for example, User 3), until the request is accepted or expired (Step S306). If one of the users accepts the request, then the users are connected (Step S307). After User 1 is connected with someone and receives the exact location of the parking spot, User 1 may drive to the parking space of the user who accepts the request (Step S308). User 1 can also choose to start this process again if user who accepted the request does not eventually leave (Step S309) or may just park at the parking spot after User 2 leaves the parking spot and users rate each other (Step S310).

Figure 3B:
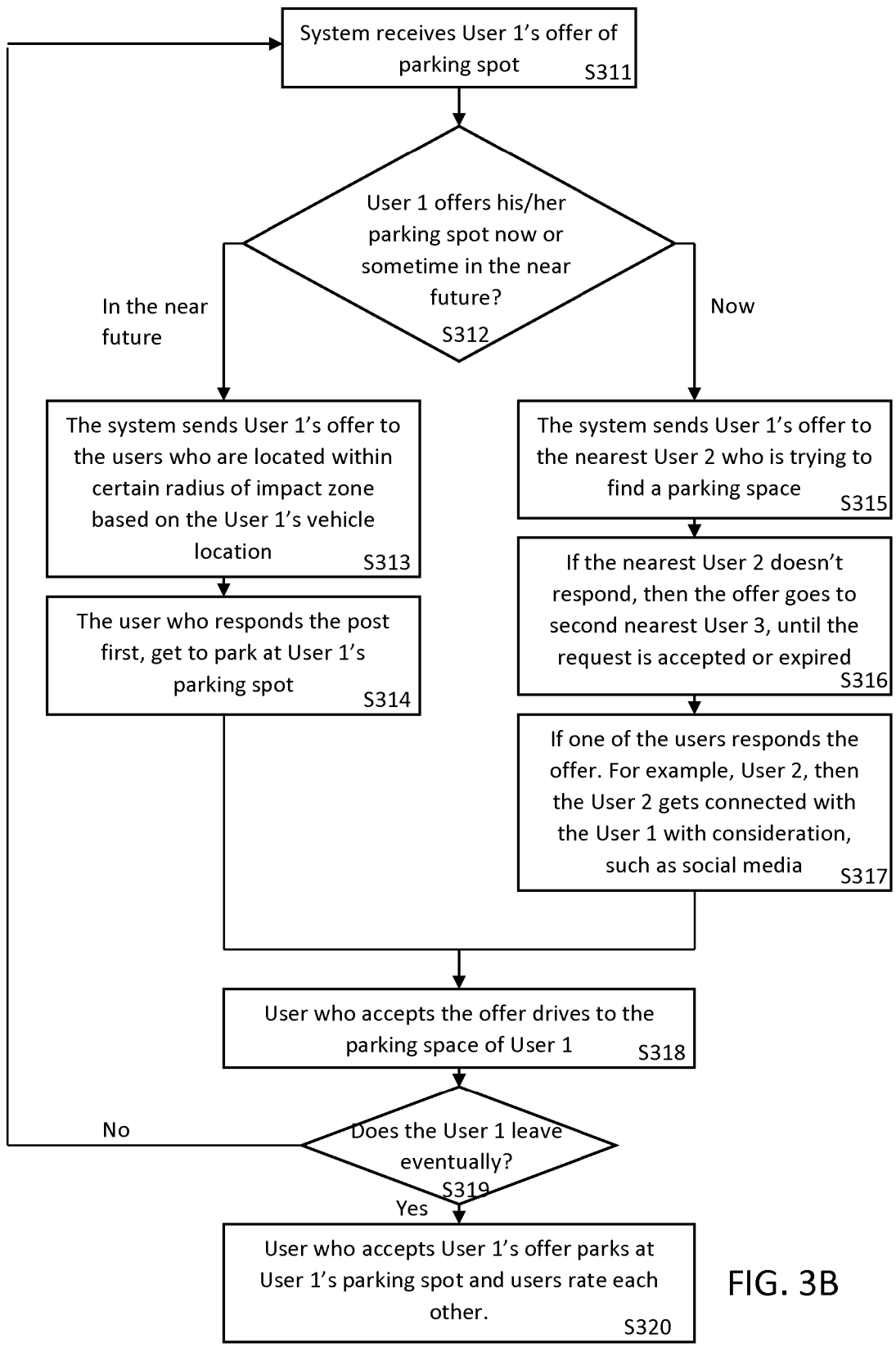
FIG. 3B is a flow chart illustrating an approach for users to post their offers for a parking spot to the system and the system will guide the users to find a match and/or navigate the users who accept the offers to find the parking spot in accordance with exemplary embodiments of the present invention.

FIG. 3B is a flow chart illustrating an approach for users to post their offers for a parking spot to the system and the system guides the users to find a match and/or navigate the users who accept the offers to find a parking spot in accordance with exemplary embodiments of the present invention. As discussed above, exemplary embodiments may be used to find a match and/or generate a notification when a driver shows intent to offer his/her parking spot to another user. With respect to FIG. 3B, after the system receives User 1's offer for an available parking spot (Step S311), and advises of the offering of his/her parking spot now or sometime in the near future (Step S312). If User 1 can offer a parking spot in the near future, then the system may send User 1's offer to the users who are located within certain radius of the impact zone based on User 1's vehicle location (Step S313), and the user who responds the post first, may be able to park at User 1's parking spot (Step S314). If User 1 wants to offer his/her parking spot right now, then the system may send User 1's offer to the nearest user, for example User 2, who is trying to find a parking space (Step S315), and if User 2 does not respond, then the offer may be sent to the second nearest user, for example User 3, until the request is either eventually accepted or expired (Step S316). If a User responds to the offer, for example User 2, then the User 2 may be connected with User 1 with consideration (Step S317). After the user who accepted the request connects with User 1, the system may send the parking space address to the user who accepted the offer, allowing him/her to drive to User 1's parking space and wait for the spot to become available (Step S318). User 1 may choose to start this process again if User 1 does not eventually leave (Step S319) or may just park in User 1's parking spot after User 1 leaves the parking spot and the other users rate each other (Step S320).

Figure 4A:
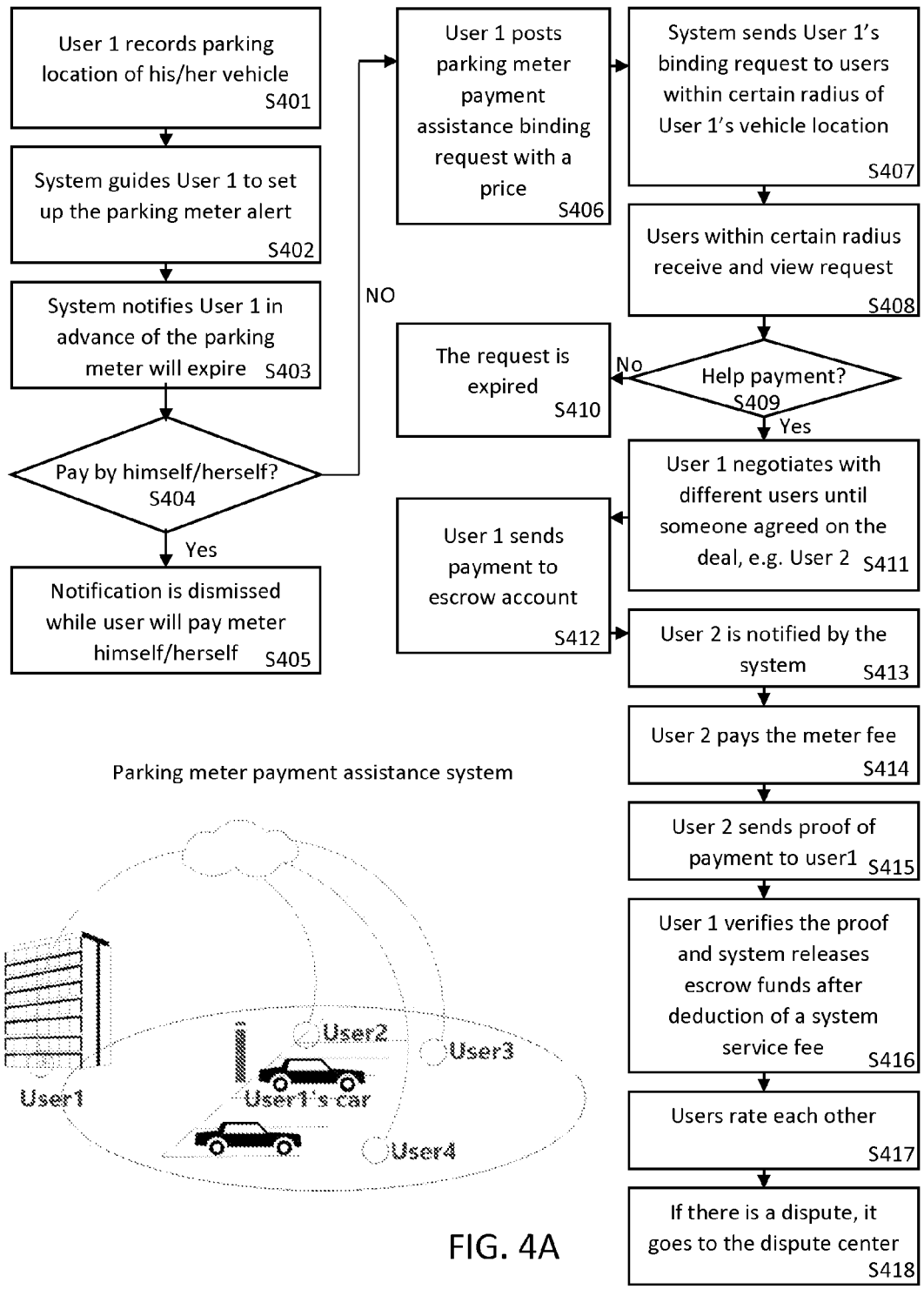
FIG. 4A is a flow chart illustrating an approach for a parking meter payment assistance system through a user's request of the service to refill the parking meter in accordance with exemplary embodiments of the present invention.

FIG. 4A is a flow chart illustrating an approach for a parking meter payment assistance system through a user's request of the service to refill the parking meter in accordance with exemplary embodiments of the present invention. With respect to FIG. 4A, the first user, for example User 1, may press a button on the display of the mobile communications device to record the parking location of his or her vehicle (Step S401). User 1 sets up a parking meter alert (Step S402) in which User 1 may choose how many reminder alerts and at intervals with how much time in advance to send the alert. When parking meter is approaching expiration, the user will receive a notification (Step S403) based on the user's prior settings (Step S401). If the user can refill the parking meter by himself (Yes, Step S404), then the notification will disappear (Step S405) and the user may refill the parking meter before it expires. If User 1 cannot refill the meter (No, Step S404), User 1 can post a request (Step S406) to other users who are located within a certain radius of the current location of User 1's parked vehicle and not User 1's current location, to help him or her refill the parking meter. User 1 sends the request (Step S407) through the central server. The system will match the location with other users and send request for other users to view the request (Step S408). The request (Step S407) may contain information such as the amount User 1 needs to pay to refill the meter, the amount for a service fee to a second user, for example User 2, for User 2's assistance, the time it may take for User 2 to walk or drive to the location of User 1's parking vehicle, and the amount of time remaining until the parking meter expires or the actual time the parking meter will expire. When nearby users receive and views the request (Step S408), he/she can choose to respond or not respond to the request (Step S409). If yes, User 1 and another user, for example User 2, may negotiate the payment terms until agreed on the deal (Step S411). If the other user accepts, the system will guide User 1 to pay to an escrow account (Step S412) within the mobile application. If no, User 2 may choose not to respond and the request will disappear (Step S410). User 2 will be notified (Step S413) about the funds in the escrow account. After User 2 assists by paying the parking meter (Step S414), User 2 may send proof of payment to User 1 through the platform of the system (Step S415) which may be various pictures and User 1 may verify the proof of payment (Step S416). A service fee may be charged before the release of funds in escrow to User 2 (Step S416). The parking location is recorded when the user parks his/her vehicle, presses a button, and the central server records the current location based on the GPS receiver. Users rate each other (Step S417) and if there is a dispute between User 1 and User 2, both users can report to the system, and the Administrator will help users to solve any disputes (Step S418).

Figure 4B:
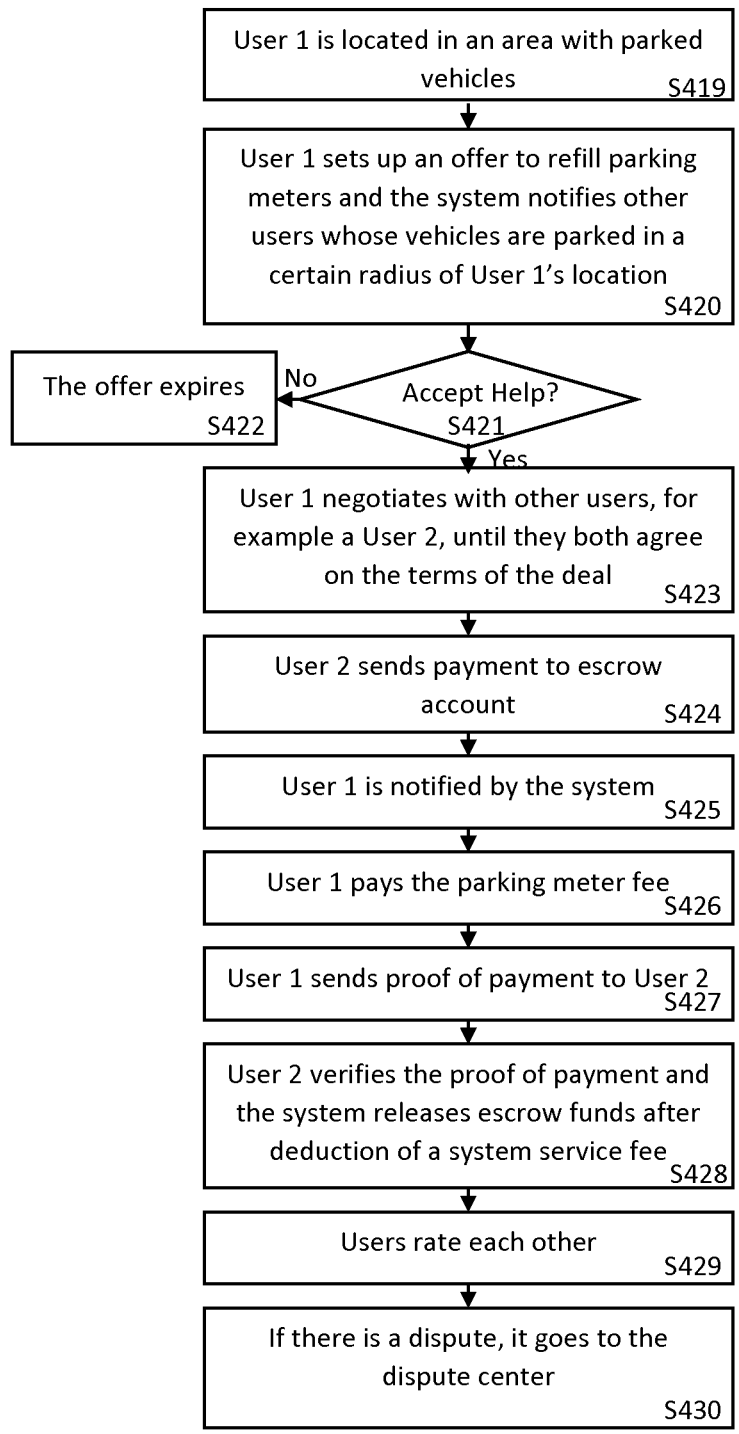
FIG. 4B is a flow chart illustrating an approach for a parking meter payment assistance system through a user's offer of the service to refill the parking meter in accordance with exemplary embodiments of the present invention.

FIG. 4B is a flow chart illustrating an approach for a parking meter payment assistance system through a user's offer of the service to refill the parking meter in accordance with exemplary embodiments of the present invention.

A user, for example User 1, may be located in an area with parked vehicles (Step S419). User 1 may offer to help refill parking meters by pressing a button on the display of the mobile communications device (Step S420) to begin the process to set up an offer to assist other users in refilling a meter that may be approaching expiration for a fee by sending a message to other users whose parked vehicle locations are within a certain radius of User 1's current location. The radius may be set and adjusted by the users. User 1 may send out a message through the system to other users whose parked vehicle location are within a certain radius of User 1 and the system will broadcast the offer (Step S420) that may include the amount User 1 would like to receive as a service charge. This service charge may be negotiable. When the other users receive and view the offer, he/she can choose to respond or not respond to the offer. If other users don't want to accept the assistance of User 1 (No, Step S421), then the offer will expire (Step S422). If a user would like to accept the offer (Yes, Step S421), then User 1 will negotiate with other users who accept User 1's assistance until both users come to an agreement on the terms of the deal (Step S423). Once User 1 makes a deal with another user, for example, User 2, then the system will guide User 1 to send payment to an escrow account. After User 2 sends payment to an escrow account (Step S424) within the platform of the system, User 1 will be notified by system of the payment (Step S425). The system will notify User 1 that the payment is in escrow and User 1 can then pay for the meter fee (Step S426). User 1 may then send proof of payment to User 2 through the platform of the system (Step S427) which may be various pictures. User 2 may then verify the proof of payment and direct the system to release the escrow funds after the deduction of a system service fee (Step S428). Users will rate each other after the transaction (Step S429) and if there is a dispute between User 1 and User 2, both Users can report to the system, and the Administrator will help Users to solve any disputes (Step S430). Additionally, the Administrator may hire employees to use this method to send out messages with offers to help refill parking meters for a fee.

As discussed above, the present invention may utilize a handheld mobile device such as a smart phone or other mobile communications device for both the reporting of parking violations and the receiving of parking alerts.

Figure 5A:
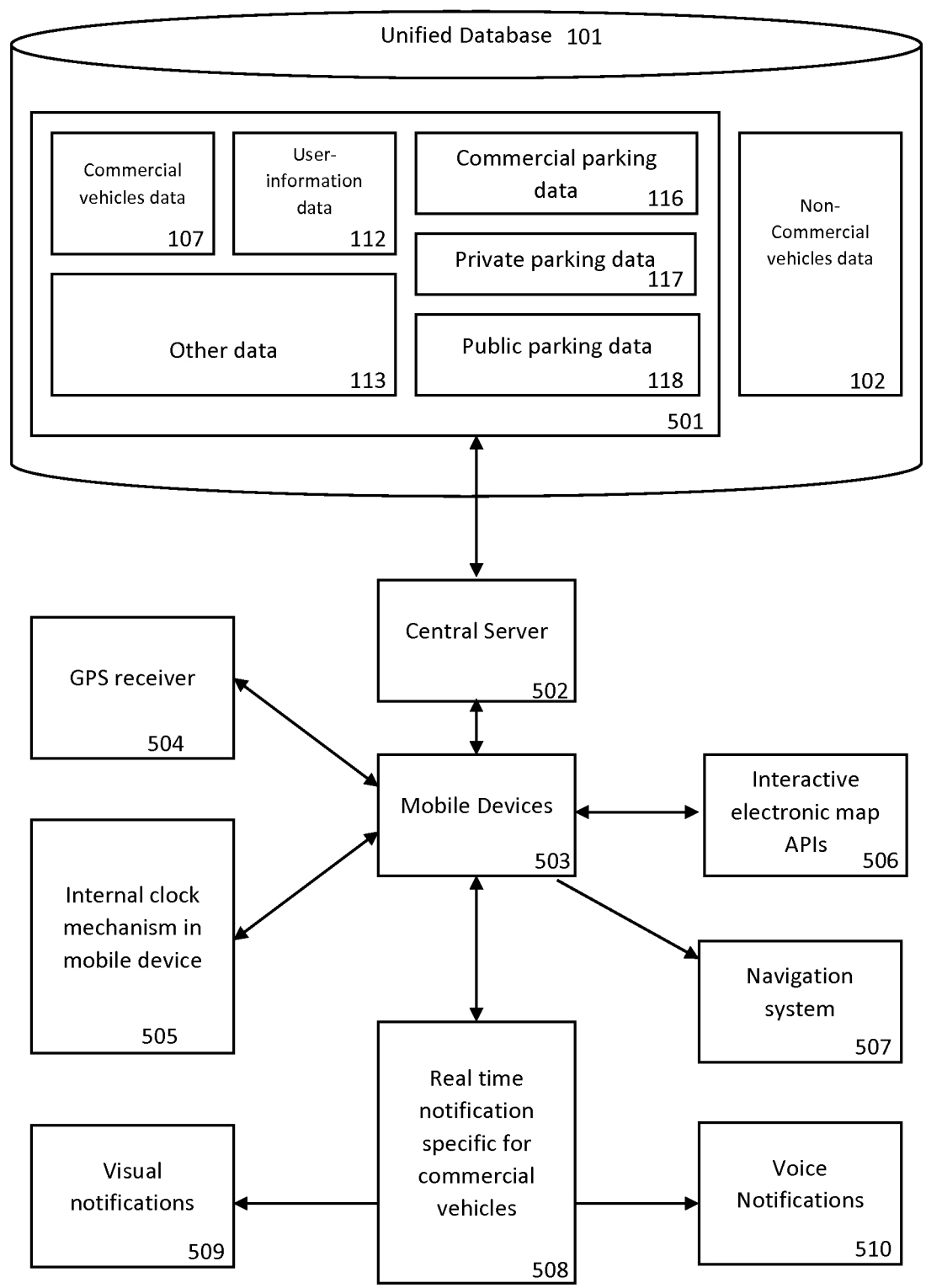
FIG. 5A is a schematic diagram illustrating a system for mobile devices to connect with the system's unified database and generate corresponding real-time notifications for commercial vehicles in accordance with exemplary embodiments of the present invention.

FIG. 5A is a schematic diagram illustrating a system for mobile devices to connect with the system's unified database and generate corresponding real-time notifications for commercial vehicles in accordance with exemplary embodiments of the present invention. The system may generate corresponding real-time notifications for commercial vehicles based on the user's location, the mobile communications device's time, and type of vehicle. With respect to FIG. 5A, the unified database for commercial vehicles 501, which includes the commercial vehicles data set 107, user-information data set 112 including the type of vehicle and type of vehicle plate, commercial parking data 116, private parking data 117, public parking data 118 and other data 113 will be used to generate notifications for commercial vehicles only. The mobile communications device 503 generates the real-time notifications for commercial vehicles 508 through Interactive Electronic Map APIs 506 and through the central server 502 that connects to unified database 101, which includes the corresponding Parking information, RRLC information, comments from other users, etc. from unified database for commercial vehicles 501, and based on the location information and date/time information that received from the GPS receiver 504 and internal clock mechanism inside the mobile communications device 505. The notifications specific to commercial vehicles 508 may be delivered in two ways: visually 509 and by voice 510. The system also navigates the commercial vehicles to park with its navigation system 507.

Figure 5B:
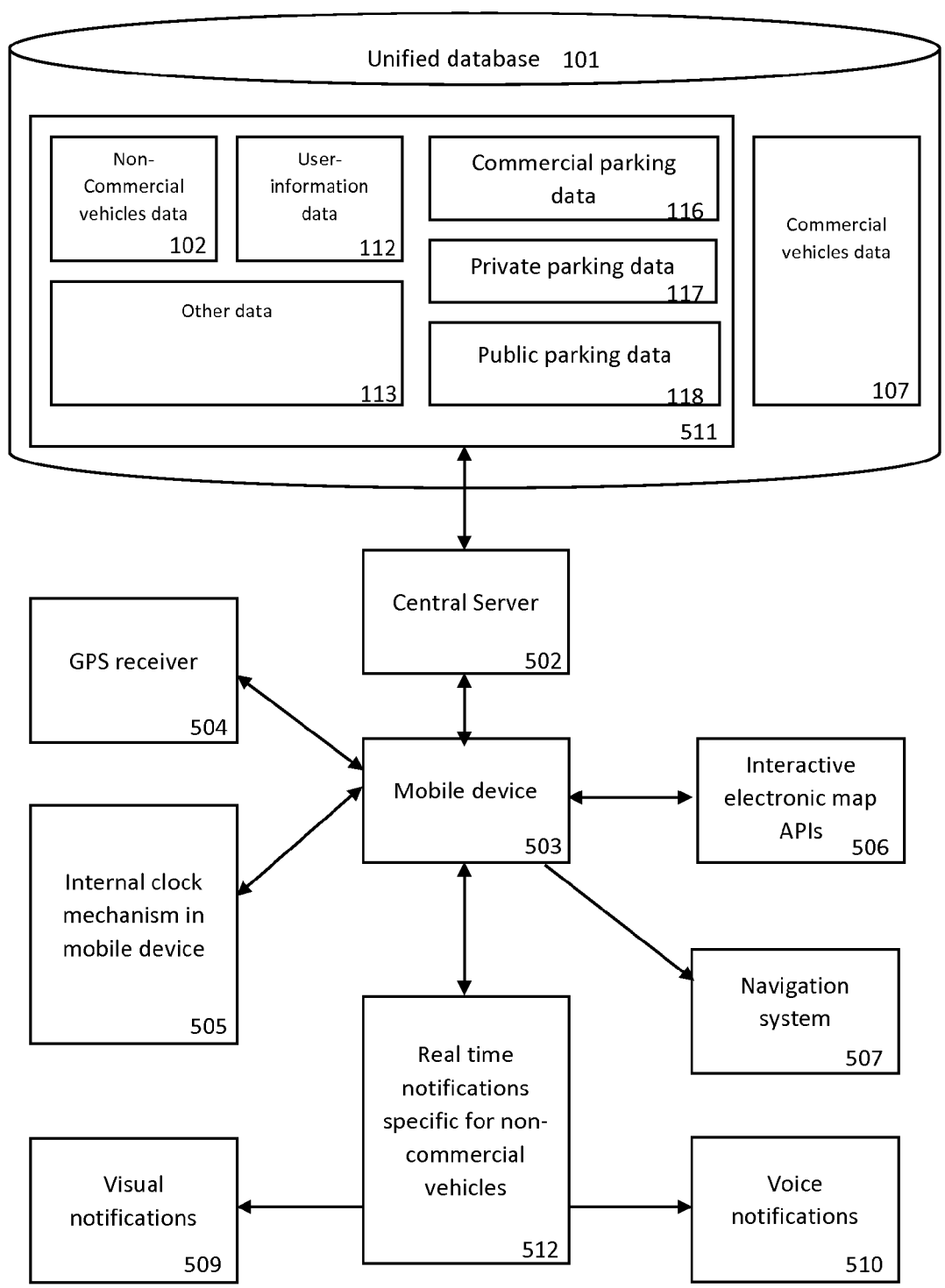
FIG. 5B is a schematic diagram illustrating a system for mobile devices to connect with the system's unified database and generate corresponding real-time notifications for non-commercial vehicles in accordance with exemplary embodiments of the present invention.

FIG. 5B is a schematic diagram illustrating a system for mobile devices to connect with the system's unified database and generate corresponding real-time notifications for non-commercial vehicles in accordance with exemplary embodiments of the present invention. The system may generate corresponding real-time notifications for non-commercial vehicles based on the user's location, the mobile communications device's time, and type of vehicle. With respect to FIG. 5B, the unified database for non-commercial vehicles 511, which includes the non-commercial vehicles data set 102, user-information data set 112 including the type of vehicle and type of vehicle plate, commercial parking data 116, private parking data 117, public parking data 118 and other data 113 will be used to generate notifications for non-commercial vehicles through central server 502. The mobile communications device 503 generates the real-time notifications specific for non-commercial vehicles 512 through Interactive Electronic Map APIs 506 and through the central server that connects to unified database 101, which includes the corresponding Parking information, RRLC information, comments from other users, etc. from unified database for non-commercial vehicles 511, and based on the location information and date/time information that received from the GPS receiver 504 and internal clock mechanism inside the mobile communications device 505. The notifications specific to non-commercial vehicles 512 may be delivered in two ways: visually 509 and by voice 510. The system also navigates the non-commercial vehicles to park with its navigation system 507.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

I claim:

1. A computer-implemented method for providing a guideline for legal parking, said method comprising the steps of:
    utilizing a database residing in a central server to store legal parking related data;
    categorizing said legal parking related data into data types comprising at least one of: commercial vehicle legal parking related data, non-commercial vehicle legal parking related data, legal parking related data based on type of vehicle, or legal parking related data based on type of vehicle plate;
    receiving a location of a user and a time from a location identifier in communication with an internal clock mechanism;
    determining one or more unavailable or illegal parking locations based on at least one of: (i) a user type of said user, (ii) one or more parking prohibitions directly applicable to said user, or (iii) one or more parking prohibitions applicable to said user by inference;
    identifying one or more potentially available legal parking locations by precluding said one or more unavailable or illegal parking locations from said legal parking related data in said database based on said user type;
    notifying said user of a guideline for legal parking based on said data type corresponding to said user type; and
    updating said legal parking related data in said database dynamically.

2. The method according to claim 1, said method further comprising the step of:
    receiving said legal parking related data from at least one of: one or more additional users, a government agency, a non-government organization, a private entity, a community organization, a media source, a municipality, a municipal driver, a private company driver, an employee of said system, a third-party contractor of said system, or other interested individuals;
    wherein said legal parking related data comprises at least one of: parking violation related data, parking availability data, alternative parking data, or parking rules or regulations.

3. The method according to claim 1, said method further comprising the step of:
    categorizing said user based on said user type;
    wherein said user type is categorized based on at least one of: commercial vehicle user type, non-commercial vehicle user type, vehicle user type based on type of vehicle, or vehicle user type based on type of vehicle plate.

4. The method according to claim 1, said method further comprising the step of:
identifying a parking intent of said user based on at least one of: (i) a current speed of a vehicle of said user, (ii) a predetermined proximity of said user to an intended destination, or (iii) a specific indication of said parking intent by said user.

5. The method according to claim 1, wherein said one or more illegal parking locations are identified by at least analyzing parking violation related data.

6. The method according to claim 5, said method further comprising the step of:
predicting said one or more potential parking prohibitions directly applicable to said user based on at least one of: (i) said parking violation related data including an identical location to said identified one or more illegal parking locations; (ii) said parking violation related data including a particular time identical to said time; or (iii) said parking violation related data including a location identical to said illegal parking location, said location corresponding to said point in time identical to said time.

7. The method according to claim 1, said method further comprising the step of:
predicting said one or more parking prohibitions applicable to said user by inference based on at least one of: (i) one or more relevant parking locations; (ii) one or more relevant parking times; or (iii) one or more relevant parking locations corresponding to one or more relevant parking times.

8. The method according to claim 7, wherein said inference is based on at least two relevant parking locations corresponding to at least one relevant parking time;
wherein each of said at least two relevant parking locations has said at least one or more previously issued parking violation citations for violating one or more same type of parking prohibitions;
wherein said one or more illegal parking locations are between said at least two relevant parking locations; and
wherein said at least two relevant parking locations are at a distance from each other.

9. The method according to claim 7, wherein said inference is based on at least two relevant parking times corresponding to at least one relevant parking location;
wherein each of said at least two relevant parking times has said at least one or more previously issued parking violation citations for violating one or more same type of parking prohibitions;
wherein at least one of said one or more identified times is between said at least two relevant parking times; and
wherein said at least two relevant parking times are within a relevant time frame.

10. The method according to claim 7, wherein said inference is based on at least two relevant parking locations corresponding to at least two relevant parking times;
wherein each of said at least two relevant parking locations has said at least one or more previously issued parking violation citations for violating one or more same type of parking prohibitions;
wherein said time is between said at least two relevant parking times;
wherein said at least two relevant parking times are within a relevant time frame;
wherein said one or more illegal parking locations are between said at least two relevant parking locations; and
wherein said at least two relevant parking locations are at a distance from each other.

11. The method according to claim 1, wherein one or more notifications of said one or more potentially available legal parking locations are displayed to said user based on said data type corresponding to said user type of said user.

12. The method according to claim 1, wherein said one or more potential parking prohibitions directly applicable to said user are identified based on at least one of: (i) said parking violation related data including at least one location identical to said one or more illegal parking locations; (ii) said parking violation related data including at least one point in time identical to said time; or (iii) said parking violation related data including at least one location identical to said one or more illegal parking locations, said location corresponding to at least one point in time identical to said time.

13. The method according to claim 1, said method further comprising the step of:
generating one or more notifications for said user comprising one or more reasons said location does not have said one or more potentially available legal parking; and
wherein said one or more reasons include at least one of: (i) said location is occupied, or (ii) said location is associated with at least one violation for illegal parking.

14. The method according to claim 1, wherein one or more notifications relating to said one or more potentially available legal parking locations are displayed to said user based on said data type corresponding to said user type,
wherein said one or more notifications relating to said one or more potentially available legal parking locations are displayed to said user within a predetermined distance of a destination of said user,
wherein said one or more potentially available legal parking locations are reflected differently from said one or more illegal or unavailable parking locations through at least one or more different formats to increase possibility of finding said one or more potentially available legal parking locations for said user, and
wherein said one or more different formats comprise at least different colors, shapes, lines or any other formats to identify a difference.

15. The method according to claim 14, wherein said one or more illegal parking locations displayed through said at least one or more different formats are based on fluctuations in issued parking violation citations, and
wherein said fluctuations in issued parking violation citations displayed through said at least one or more different formats are based on at least time of day or location.

16. The method according to claim 1, said method further comprising the step of:
utilizing a forum module through one or more remote computing devices in communication with said database to receive said legal parking related data from one or more users.

17. The method according to claim 1, said method further comprising the steps of:
enabling said user or one or more additional users to report said legal parking relevant data.

18. The method according to claim 17, said method further comprising the steps of:

enabling said one or more additional users having firsthand experience with said location to provide one or more ratings of said guideline, said firsthand experience being identified as said one or more additional users passing or having passed within a predetermined distance of said location.

19. The method according to claim 18, wherein one or more rewards are issued to said user or said one or more additional users reporting said legal parking relevant data,
wherein issuance of said one or more rewards is based on a number of said one or more ratings reaching a predetermined number of positive ratings, and
wherein said one or more rewards are monetary or non-monetary.

20. The method according to claim 19, wherein upon reaching said predetermined number of positive ratings said legal parking related data is updated in said database.

\* \* \* \* \*